US011355774B2

(12) United States Patent
Lee et al.

(10) Patent No.: US 11,355,774 B2
(45) Date of Patent: Jun. 7, 2022

(54) THERMALLY-DRAWN FIBER INCLUDING ELECTROCHEMICALLY ACTIVE GELS

(71) Applicant: Massachusetts Institute of Technology, Cambridge, MA (US)

(72) Inventors: Jung Tae Lee, Cambridge (GB); Benjamin Jean-Baptiste Grena, San Francisco, CA (US); Tural Khudiyev, Revere, MA (US); Chong Hou, Wuhan (CN); Yoel Fink, Brookline, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 331 days.

(21) Appl. No.: 16/361,157

(22) Filed: Mar. 21, 2019

(65) Prior Publication Data

US 2020/0028198 A1    Jan. 23, 2020

Related U.S. Application Data

(60) Provisional application No. 62/646,580, filed on Mar. 22, 2018.

(51) Int. Cl.
*H01M 10/02* (2006.01)
*H01M 10/0565* (2010.01)
(Continued)

(52) U.S. Cl.
CPC .......... *H01M 10/02* (2013.01); *H01M 4/485* (2013.01); *H01M 4/5825* (2013.01);
(Continued)

(58) Field of Classification Search
CPC ....... H01M 10/02–0525; H01M 10/058–0587; H01M 4/04;
(Continued)

(56) References Cited

U.S. PATENT DOCUMENTS

| 4,029,726 A | 6/1977 | Nichols |
| 4,522,897 A * | 6/1985 | Walsh ..................... H01M 4/08 |
| | | 429/119 |

(Continued)

FOREIGN PATENT DOCUMENTS

| WO | 2007143237 A2 | 12/2007 | |
| WO | WO-2018154927 A1 * | 8/2018 | .......... H01M 10/058 |

OTHER PUBLICATIONS

Bae et al., "Fiber Supercapacitors Made of Nanowire-Fiber Hybrid Structures for Wearable/Flexible Energy Storage," Angew. Chem. Int. Ed., vol. 50, pp. 1683-1687, Jan. 2011.

(Continued)

*Primary Examiner* — Jonathan Crepeau
*Assistant Examiner* — Jacob Buchanan
(74) *Attorney, Agent, or Firm* — Theresa A. Lober

(57) ABSTRACT

Provided herein is a fiber having a fiber body including fiber body material with a longitudinal-axis fiber body length. A plurality of gel domains is disposed within the fiber body along at least a portion of the longitudinal-axis fiber body length. Each gel domain includes a porous host matrix material and a liquid gel component that is entrapped in the molecular structure of the host matrix material and that is disposed in interstices of the host material matrix. At least two of the gel domains within the fiber body are disposed directly adjacent to each other in direct physical contact with each other. This fiber can include polymeric fiber body material and gel domains including a porous polymer host matrix material and an ionically conducting liquid solvent that is entrapped in the molecular structure of the polymer host matrix material and disposed in interstices of the polymer host material matrix.

30 Claims, 18 Drawing Sheets

(51) Int. Cl.
H01M 4/58 (2010.01)
H01M 4/485 (2010.01)
H01M 4/02 (2006.01)

(52) U.S. Cl.
CPC .. *H01M 10/0565* (2013.01); *H01M 2004/023* (2013.01); *H01M 2004/025* (2013.01); *H01M 2300/0085* (2013.01)

(58) Field of Classification Search
CPC ... H01M 4/0471; H01M 4/0483–0485; H01M 4/13–133; H01M 4/139–1393; H01G 11/26; H01G 11/40; H01G 11/50; D03D 1/0088
See application file for complete search history.

(56) References Cited

U.S. PATENT DOCUMENTS

| | | | |
|---|---|---|---|
| 4,957,943 | A | 9/1990 | McAllister |
| 5,744,236 | A | 4/1998 | Rohrbach |
| 6,004,691 | A * | 12/1999 | Eshraghi ............... H01M 8/10 429/133 |
| 6,117,802 | A | 9/2000 | Rohrbach |
| 6,610,395 | B2 | 8/2003 | Rohrbach |
| 7,935,418 | B2 | 5/2011 | Koops et al. |
| 8,383,026 | B1 | 2/2013 | Luebke et al. |
| 10,406,723 | B2 | 9/2019 | Fink et al. |
| 2005/0053345 | A1* | 3/2005 | Bayindir ............... H01L 31/09 385/123 |
| 2008/0053891 | A1 | 3/2008 | Koops et al. |
| 2011/0103756 | A1* | 5/2011 | Rice ..................... C30B 29/46 385/123 |
| 2011/0311876 | A1* | 12/2011 | Sturgeon ............... H01G 11/34 429/232 |
| 2012/0189795 | A1 | 7/2012 | Wong |
| 2012/0214040 | A1* | 8/2012 | Tsutsumi .............. H01G 11/40 429/99 |
| 2016/0155534 | A1 | 6/2016 | Fink et al. |
| 2017/0346129 | A1* | 11/2017 | Stolyarov ............. H01G 11/40 |
| 2019/0363369 | A1* | 11/2019 | Kondo ................... H01M 50/54 |
| 2020/0028198 | A1 | 1/2020 | Lee et al. |

OTHER PUBLICATIONS

Chen, "Novel Electric Double-Layer Capacitor with a Coaxial Fiber Structure," Adv. Mater. vol. 25, pp. 6436-6441, Aug. 2013.
Chen, "Electrochromic Fiber-Shaped Supercapacitors" Adv. Mater. vol. 26, pp. 8126-8132, Oct. 2014.
Chen et al., "High-Performance, Stretchable, Wire-Shaped Supercapacitors," Angew. Chem. Int. Ed., vol. 54, pp. 618-622, Nov. 2014.
Choi et al., "Flexible Supercapactor Made of Carbon Nanotube Yarn with Internal Pores," Adv., Mater., vol. 26, pp. 2059-2065, Dec. 2013.
Fu et al., "Fiber Supercapacitors Utilizing Pen Ink for Flexible/Wearable Energy Storage," Adv. Mater., vol. 24, pp. 5713-5718, Aug. 2012.
Hu et al., "All-in-one graphene fiber supercapacitor," Nanoscale, vol. 6, pp. 6448-6451, Apr. 2014.
Kou et al., "Coaxial wet-spun yarn supercapacitors for high-energy density and safe wearable electronics," Nature Communications, V. 5, pp. 3754(1-10), May 2014.
Kwon et al., "Cable-Type Flexible Lithium Ion Battery Based on Hollow Multi-Helix Electrodes," Avd. Mater., vol. 24, pp. 5192-5197, Aug. 2012.
Le et al., "Coaxial Fiber Supercapacitor Using All-Carbon Material Electrodes," ACSNano, vol. 7, No. 7, pp. 5940-5947, Jun. 2013.
Lee et al., "Ultrafast charge and discharge biscrolled yarn supercapacitors for textiles and microdevices," Nature Communications, vol. 4, pp. 1970(1-8), Jun. 2013.
Liang et al., "Series of in-fibergraphene supercapacitors for flexible wearable devices," J. Mater. Chem. A., vol. 3, pp. 2547-2551, Dec. 2014.
Lima et al., "Biscrolling Nanotube Sheets and Functional Guests into Yarns," Science, vol. 33, pp. 51-55, Jan. 2011.
Lin et al., "Twisted Aligned Carbon Nanotube/Silicon Composite Fiber Anode for Flexible Wire-Shaped Lithium-Ion Battery," Adv. Mater., vol. 26, pp. 1217-1222, Nov. 2013.
Liu et al., "Cable-Type Supercapacitors of Three-Dimensional Cotton Thread Based Multi-Grade Nanostructures for Wearable Energy Storage," Adv. Mater., vol. 25, pp. 4925-4931, Jul. 2013.
Neudecker et al., "Power fibers: Thin-Film Batteries on Fiber Substrates," Unclassified OMB Report, Report Documentation page and Report pp. 1-9, ITN Energy Systems, Inc, Littleton, CO, 2003.
Ren et al., "Twisting Carbon Nanotube Fibers for Both Wire-Shaped Micro-Supercapacitor and Micro-Battery," Adv. Mater., vol. 25, pp. 1155-1159, Nov. 2012.
Ren et al., "Elastic and Wearable Wire-Shaped Lithium-Ion Battery with High Electrochemical Performance," Angew. Chem. Int., Ed., vol. 53, pp. 7864-7869, Jun. 2014.
Wang et al., "Fiber-Based Flexible All-Solid-State Asymmetric Supercapacitors for Integrated Photodetecting System," Angew. Chem. Int. Ed., vol. 53, pp. 1849-1853, Jan. 2014.
Weng et al., "Winding Aligned Carbon Nanotube Composite Yarns into Coaxial Fiber Full Batteries with High Performances," Nano Lett., vol. 14, pp. 3432-3438, May 2014.
Xiao et al., "Fiber-Based All-Solid-State Flexible Supercapacitors for Self-Powered Systems," ACSNano, vol. 6, No. 10, pp. 9200-9206, Sep. 2012.
Xu et al., "Carbon Nanotube Fiber Based Stretchable Wire-Shaped Supercapacitors," Adv. Energy Mater., vol. 4, pp. 1300759(1-6), Oct. 2013.
Yang et al., "A Highly Stretchable, Fiber-Shaped Supercapacitor," Angew. Chem. Int. Ed., vol. 52, p. 13453-13457, Nov. 2013.
Yu et al., "Scalable synthesis of hierarchically structured carbon nanotube-graphene fibres for capacitive energy storage," Nature Nanotechnology, vol. 9, pp. 555-562, Corrigendum one page, Supplementary Information pp. S1-S32, Jul. 2014.
Zhang et al., "Integrated Polymer Solar Cell and Electrochemical Supercapacitor in a Flexible and Stable Fiber Format," Adv. Mater., vol. 26, pp. 466-470, Oct. 2013.
Zhang et al., "Superelastic Supercapacitors with High Performances during Stretching," Adv. Mater., vol. 27, pp. 356-362, Nov. 2014.
Zhang et al. "Flexible and Stretchable Lithium-Ion Batteries and Supercapacitors Based on Electrically Conducting Carbon Nanotube Fiber Springs," Angew. Chem. Int. Ed., vol. 53, pp. 14564-14568, Oct. 2014.
Zhang et al., "Super-stretchy lithium-ion battery based on carbon nanotube fiber," J. Mater. Chem. A., vol. 2, pp. 11054-11059, May 2014.
Lestoquoy et al., "Fabrication and characterization of thermally drawn fiber capacitors," Appl. Phys. Letts., No. 102, pp. 152908-1-152908-5, Apr. 2013.
Qu et al., "Flexible fiber batteries for applications in smart textiles," 2012 MRS Fall Meeting, Invited Talk A4.01, Symposium A: Compliant Energy Sources, Manuscript ID: 1445687, pp. 1-8, Boston, MA, Oct. 2012.
Grena, "Towards a Lithium-ion Fiber Battery," Masters of Science in Materials Science and Engineering, Thesis, Massachusetts Institute of Technology, pp. 1-47, Jul. 2013.
Liu et al., "Flexible, Solid Electrolyte-Based Lithium Battery Composed of LiFePO4 Cathode and Li4Ti5O10 Anode for Applications in Smart Textiles," Jnl. of the Electrochmical Society, N. 159, pp. A349-A356, Jan. 2012.
Grena et al., "Porous polymeric domains in thermally drawn fibers," 2014 MRS Spring Meeting, Session R9, Poster Session III: Energy Conversion and Storage, Poster R9 15, San Francisco, CA, Apr. 2014.
Wypych, "Handbook of Fillers," 3rd Edition, Section 5.4: "Particle Shape," ChemTec Publishing, pp. 232-233, Available online at: https://app.knowvel.com/hotlink/pdf/id:kt00C18G4/handbook-fillers-3rd/particle-shape, 2010.
Hamilton, "Geochemical Remote Sensing of the Sub-Surface-3.3 Voltaic Cells." Elsevier, 86-91, Online version available at: https://app.knovel.eom/hotlink/pdf/id:kt004OUTU2/geochemical-remote-sensing/voltaic-cells, 2000.

(56) References Cited

OTHER PUBLICATIONS

Gevorkian, "Lithium-ion Batteries," Large-scale Solar Power Systems: Construction and Economics. N.P.: Cambridge UP, pp. 255-259, 2012, Online version available at: https://app.knovel.com/hotlink/pdf/id:kt00C4L5G4/large-scale-solar-power/lithium-ion-battery-charge, 2012.

Schut, "New Cyclic Olefins," Plastics Technology, Mar. 2000, Online version available at: https://ptonline.com/articles/new-cyclic-olefins, 2000.

Grena, "Phase Separation in thermally-drawn fibers: From porous domains to structured Si—Ge spheres," Thesis for the degree of Doctor of Philosophy in Materials Science and Engineering at the Massachusetts Institute of Technology, pp. 1-160, Jun. 2017.

Lin et al., "Dopant Induced Hollow BaTiO3 Nanostructures for Application in High Performance Capacitors," Journal of Materials Chemistry, Vo. 21, No. 41, pp. 16500-16504, 2011.

Vali et al., "Vinylene Carbonate as Co-Solvent for Low-Temperature Mixed Electrolyte Based Supercapacitors," Jnl. of the Electrochemical Society, vol. 163, No. 6, pp. A851-A857, Mar. 2016.

Qu et al., "Flexible fiber batteries for applications in smart textiles," Smart Mater. Struct., vol. 24, pp. 025012:1-13, Dec. 2014.

"Spinning," Complete Textile Glossary, Celanese Acetate, New York, NY, no pagination, 4 pages, 2001.

Kutz, Applied Plastics Engineering Handbook "Processing, Materials, and Applications," Second Ed., Elsevier, Section 7.4.1: "Polycaprolactone," pp. 135-136, 2017.

Ebnesajjad, Fluoroplastics, vol. 1: non-Melt Processible Fluoropolymers—The Definitive User's Guide and Data Book, Second Edition, Section 5.7: Process Classificaiton Table 5.6, p. 46, 2015.

\* cited by examiner

THERMALLY-DRAWN FIBER INCLUDING ELECTROCHEMICALLY ACTIVE GELS

CROSS-REFERENCE TO RELATED APPLICATION

This application claims the benefit of U.S. Provisional Patent Application No. 62/646,580, filed Mar. 22, 2018, the entirety of which is hereby incorporated by reference.

STATEMENT REGARDING FEDERALLY SPONSORED RESEARCH

This invention was made with Government support under Contract No. DMR-1419807, awarded by the U.S. NSF; and under Contract No. W911NF-13-D-0001, awarded by the U.S. ARO. The Government has certain rights in this invention.

BACKGROUND

This invention relates generally to thermally drawn fibers, and more particularly relates to thermally drawn fiber composition for electrochemical devices and systems.

The need for mobile power systems that are flexible and light-weight is increasing dramatically as novel electrical systems are developed. For example, recent advances in fiber-based semiconductor fabrication and integration have created an entirely new field of mobile electronic systems that can include fabric-based, networked devices. With such advances, the importance of reliable and textile-compatible energy storage solutions is growing.

Li-ion batteries (LiB) dominate the mobile energy storage market due to their excellent power and energy density characteristics. But conventional flat and bulky LiBs intrinsically limit product design, in turn limiting product functionality, comfort, identification, and aesthetics. Conventional LiB, and conventional batteries in general, therefore do not accommodate the growing field of textile-based electrical systems. Efforts at direct miniaturization of batteries have generally involved complex, multi-step processes, and are not scalable to practical sizes.

In contrast, fibers are ubiquitous in daily life, as found in, e.g., the textiles of garment fabrics, the components of vehicles, and home furnishings, and fibers provide functionality, comfort, and aesthetics for many applications. Thus, in many respects, fibers represent an ideal form factor in that they are the primary building blocks for textiles. As a result, fiber-based energy systems have become a very interesting possibility for enabling the integration of energy and power into a textile format with conventional methods such as weaving and knitting.

Conventional thermal drawing of optical fiber stands out as an intrinsically scalable fabrication method—with more than 100 million kilometers of optical fiber produced every year—while still offering the ability to combine multiple materials into complex fiber architectures. However, while a wide variety of materials have been successfully drawn into fiber structures, the thermomechanical and rheological properties of conventional battery active materials are not compatible with thermal drawing approaches. Conventional battery active materials present very high melting points, or degrade prior to melting, and the uncontrolled nature of high-temperature thermal drawing can trigger chemical reactions and materials degradations that render battery materials non-functional. As a result, fiber-based energy storage development has been severely limited by the inherent chemistry required for battery operation.

SUMMARY

Herein is provided a fiber that overcomes the limitations of conventional electrochemical materials in addressing fiber-based energy storage. The fiber has a fiber body including a fiber body material with a longitudinal-axis fiber body length. A plurality of gel domains is disposed within the fiber body along at least a portion of the longitudinal-axis fiber body length. Each gel domain in the plurality of gel domains includes a porous host matrix material. Each gel domain further includes a liquid gel component that is entrapped in the molecular structure of the host matrix material and that is disposed in interstices of the host material matrix. At least two of the gel domains within the fiber body are disposed directly adjacent to each other in direct physical contact with each other.

This fiber configuration enables the fiber to include a polymeric fiber body material and to include gel domains that each include a porous polymer host matrix material and an ionically conducting liquid solvent component that is entrapped in the molecular structure of the polymer host matrix material and that is disposed in interstices of the polymer host material matrix.

In embodiments provided herein, one of the gel domains in the fiber is disposed within the fiber body between and in direct contact with two electrochemically active electrode gel domains. Here each electrochemically active electrode gel domain includes electrically conducting particles dispersed in the polymer host material matrix, and a separate polymeric electrical contact is disposed in direct contact with each one of the two electrochemically active electrode gel domains and extends the fiber body length. A separate current collector is disposed in direct contact with each polymeric electrical contact and extends the fiber body length. In further embodiments provided herein, one of the gel domains in the fiber is disposed within the fiber body between and in direct contact with an electrochemically active anode gel domain and an electrochemically active cathode gel domain. The electrochemically active anode gel domain and the electrochemically active cathode domain each include electrically conducting particles dispersed in the polymer host material matrix, with the electrochemically active anode gel domain further including lithium titanate and the electrochemically active cathode gel domain further including lithium iron phosphate. Here a separate polymeric electrical contact is disposed in direct contact with each the electrochemically active anode and cathode gel domains and extends the fiber body length. A separate current collector is disposed in direct contact with each polymeric electrical contact and extends the fiber body length.

These fiber arrangements can be produced in a method for forming a fiber in which there is assembled assembling a preform including fiber body material and a plurality of gel domains that are disposed at central preform sites within the fiber body material in a transverse cross section of the preform. Each gel domain in the plurality of gel domains includes a porous polymer host matrix material and includes an ionically conducting liquid gel component that is entrapped in the molecular structure of the host matrix material and that is disposed in interstices of the host material matrix. At least one of the gel domains is disposed between and in direct contact with two electrochemically active electrode gel domains, each electrochemically active electrode gel domain including electrically conducting particles dispersed in the polymer host material matrix, and with a separate polymeric electrical contact disposed in direct contact with each one of the two electrochemically active electrode gel domains. At least one electrically conducting wire is fed into the preform, in direct contact with a polymeric electrical contact in the preform, and the assembled preform is thermally drawn into a fiber at a thermal draw temperature at which the fiber body material has a viscosity that is greater than a viscosity of each gel domain in the plurality of gel domains and at which each gel domain in the plurality of gel domains is a viscous liquid.

With these fiber arrangements and fiber production methods, there can be produced any in a wide array of fiber-based energy systems such as fiber supercapacitors and fiber batteries, and such can be produced of arbitrarily long lengths and with a such a high degree of electrochemical performance that new applications for rechargeable fiber and textile device systems can be enabled.

Other features and advantages will be apparent from the following description and accompanying drawings, and from the claims.

DETAILED DESCRIPTION

Figure 1A:
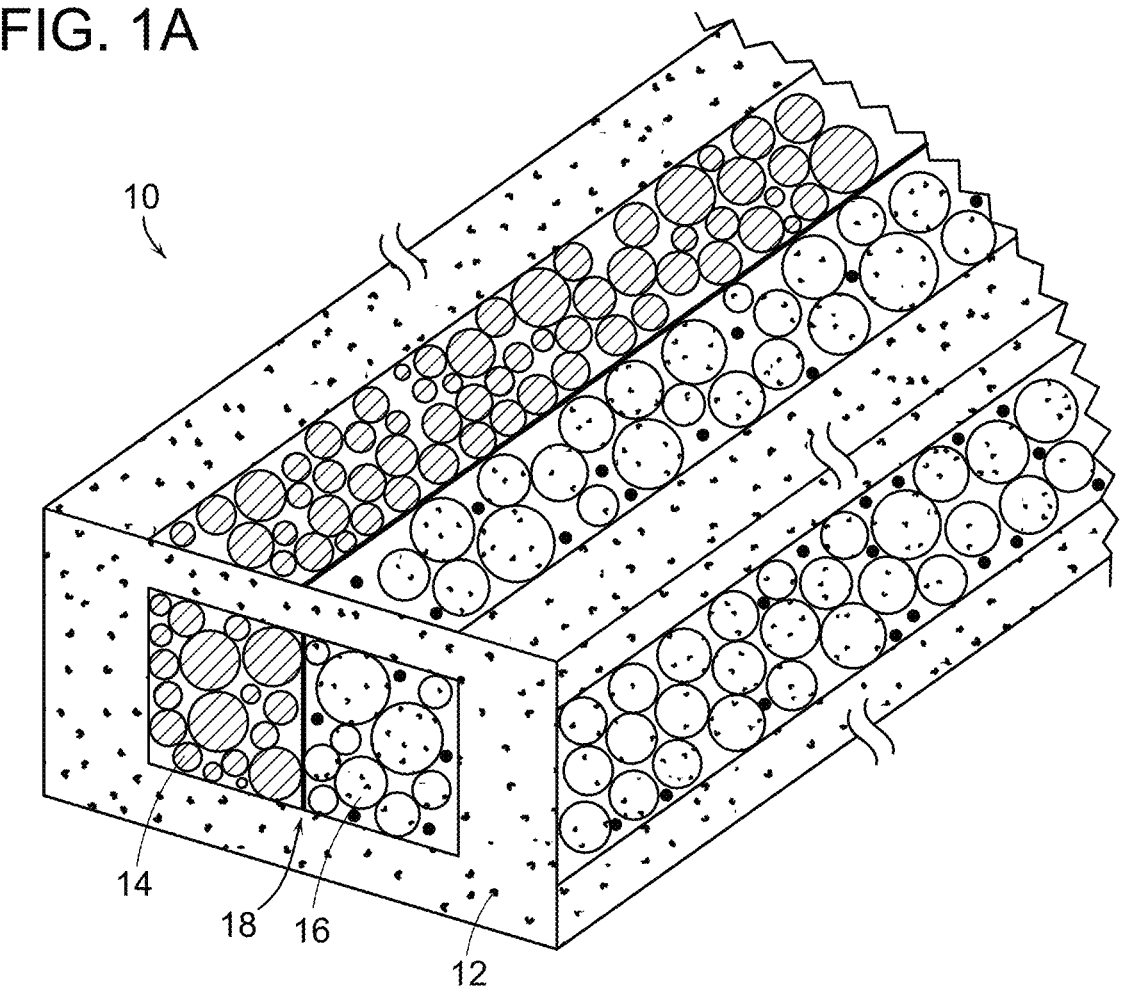
FIG. 1A is a schematic perspective view of a fiber provided herein including two adjacent gel domains within the fiber body.

Referring to FIG. 1A, a fiber 10 as-provided herein is shown schematically in perspective view. The fiber 10 includes a fiber body 12 of selected fiber body material along the entire length of the fiber. Within the fiber body, that is, inward of the fiber body material in the transverse cross section, and encapsulated at the fiber surface by the fiber body material, are disposed at least two gel domains, 14, 16. The at least two gel domains 14, 16 are different from each other in one embodiment; that is, each of the two gel domains can include gel components that are different than gel components of the other gel domain or domains; this characteristic is depicted in FIG. 1A by different gel domain fill patterns. The two different gel domains 14, 16 are directly adjacent to each other, in intimate, direct contact, at a gel interface 18. The two gel domains are disposed along at least a portion of the fiber length, in direct intimate contact with each other at the gel interface 18 along the fiber length portion, and in one embodiment, the plurality of gel domains extend the entire fiber length in direct intimate contact with at least one other gel at the gel interface 18 along the fiber length.

Figure 1B:
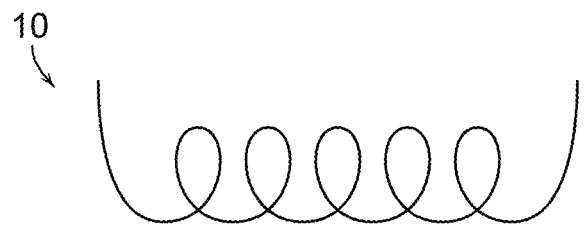
FIG. 1B is a schematic view of the fiber of FIG. 1A as an elongated, filamentary macroscopic structure.

Referring also to FIG. 1B, the fiber 10 is an elongated, filamentary macroscopic structure for which the longitudinal dimension is substantially larger than the other two fiber dimensions, defined as the fiber cross-sectional dimensions. The length, l, of the fiber is on the order of meters, e.g., 10 m, 20 m, 50 m, 100 m, 100's of kilometers, or longer, while the largest cross sectional extent of the fiber is on the order of millimeters, resulting in a fiber longitudinal-to-cross-sectional ratio that is at least about 1000. The fiber cross-section is shown in FIG. 1A as generally rectangular, but such is not required. Any suitable cross-sectional fiber geometry, e.g., circular, elliptical, rectangular, triangular, or other cross-sectional geometry, can be employed. The fiber body 12 is mechanically flexible and is not fixedly rigid. Likewise, the gel domains 14, 16 are mechanically flexible. As a result, the fiber, including the fiber body material and gel domains, maintain significant mechanical flexibility; the fiber is sufficiently flexible, e.g., to be coiled around a spool.

Figure 2A:
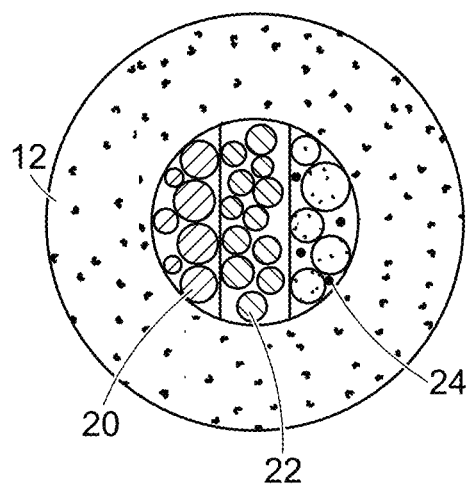
FIGS. 2A, 2B, and 2C are a schematic transverse cross-sectional view of a cylindrical fiber having three adjacent gel domains, a cylindrical fiber having three adjacent and concentric gel domains, and a hexagonal fiber having three adjacent gel domains, respectively.
Figure 2B:
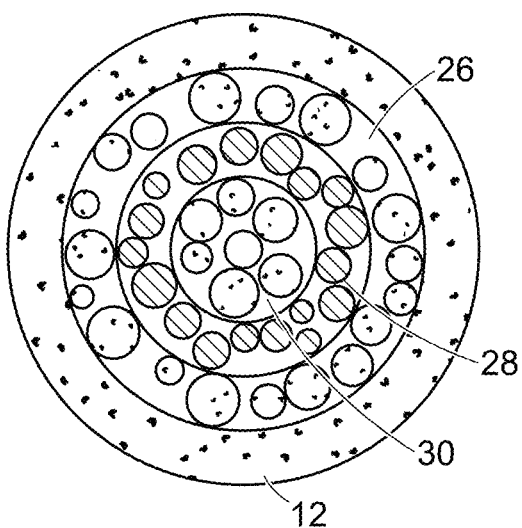
Figure 2C:
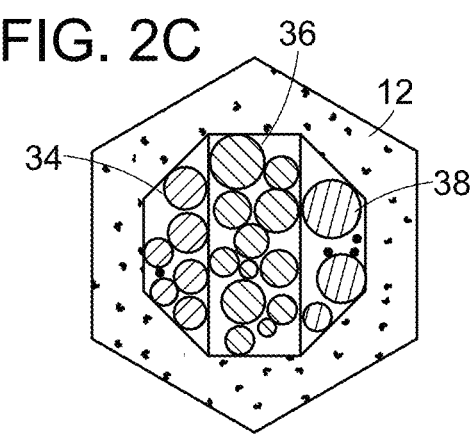

The plurality of gel domains of the fiber can be arranged in any suitable number and any suitable geometry within the fiber body 12. For example, as shown in FIG. 2A, three different gel domains 20, 22, 24 can be included within a fiber body 12. Two or more of the gel domains is disposed directly adjacent to and in intimate contact with at least one a neighboring gel domain. As shown in FIG. 2B, gel domains 26, 28, 30 can be concentrically arranged in the cross section of a fiber body 12, with each concentric gel domain disposed directly adjacent to and in intimate contact with a neighboring concentric gel domain. As shown in FIG. 2C, the fiber body 12 can be arranged in any suitable cross-sectional geometry, e.g., hexagonal, with internal gel domains 34, 36, 38, arranged in a corresponding geometry.

Each of the gel domains of the fiber are separately and individually characterized as a gel. Each gel includes a three-dimensional host matrix material. The host matrix material of the gel exhibits multi-dimensional porosity. The term porosity herein refers to a condition in which a matrix material is provided with a population of interstices, pores, holes, passages, openings, or other pathways. The matrix of the gel can therefore be considered to be a porous network. In FIGS. 1A, and 2A-2C, the host matrix material of each gel is shown to include generally spherical regions, for clarity, but the host matrix material can exhibit other structural features, including struts, pores, foam-like domains, and other features.

In the solid phase, each of the gels provided herein includes a liquid species that is entrapped in the molecular structure of the host matrix material. One example embodiment of this condition as provided herein, a liquid is entrapped in the polymer chains of a host matrix material that is a polymer including a structure of polymer chains. Referring to FIG. 1A, with this condition, each spherical region of the host matrix in gels 14, 16, includes entrapped liquid within the spherical region itself. This results in a condition in which the host matrix material behaves as a rubbery solid, with the characteristics of jelly.

The interstitial regions of each gel, between the host matrix material regions, also include liquid. In FIG. 1A, the interstitial space between the spherical matrix material regions is at least partially filled with liquid. Therefore, each gel domain includes a host matrix material in the molecular structure of which is entrapped a liquid, and includes a liquid disposed in the pores of the host matrix material. As a result, in general, by weight, the gel is therefore predominantly fluid when considered to be in the solid phase. This rubbery condition of each gel provided in the fiber extends along the length of the gel domain, i.e., along the longitudinal axis of the fiber, as well as across the cross-section of the gel domain, i.e., in one or more directions that are not along the longitudinal axis of the fiber. If the gel is exposed to ambient conditions, the liquid will evaporate from the gel interstices and will evaporate from liquid entrapment positions in the molecular structure of the host matrix, resulting in a dried host matrix. To retain the rubbery, jelly-like state of the gel, it is therefore preferred to substantially prohibit exposure of the gel to drying conditions.

Below a gelation temperature that is characteristic of a given gel composition, the gel behaves as a rubbery solid in the manner just described. At temperatures above the characteristic gelation temperature, the gel is a homogeneous viscous liquid that is a mixture of melted host matrix material and the liquid that was present in the host matrix and interstices of the host matrix. As the viscous gel liquid is cooled below the gelation temperature, there occurs a phase separation of the gel components that is marked by an abrupt change in viscosity. This phase separation is characteristic for the component species of a given gel, as described in detail below, and causes the host matrix material to solidify into a host matrix network including the liquid species entrapped in the molecular structure of the network and including the liquid species in interstices of the network.

As explained in more detail below, these gel characteristics of phase separation are discovered herein to enable the formation of a fiber that includes a plurality of different gels that are in direct contact with each other, for production of a wide range of fiber-based systems that require such an arrangement. Gel materials and characteristics can be implemented in any suitable manner, e.g., as taught in U.S. Patent Application Publication 2016/0155534A1, published Jun. 2, 2016, the entirety of which is hereby incorporated by reference.

Turning to further specifics of the gels provided in the gel domains of the fiber provided herein, in one embodiment each gel includes at least one host matrix polymer component and at least one liquid solvent component. Above a gelation temperature that is characteristic of a given host polymer component-solvent component combination, the host polymer mixes with the solvent to form a homogeneous viscous liquid. Below the characteristic gelation temperature, the host polymer solidifies into a porous polymer host matrix network and while doing so entraps solvent liquid in polymer chains of the polymer. Liquid solvent that is not entrapped in the polymer chains remains in the liquid state in the pores of the polymer host matrix. Below the gelation temperature, the host polymer can uptake a significant amount of the liquid solvent in polymer chains, causing swelling of the polymer into a corresponding rubbery condition.

In embodiments provided herein, each gel provided in a fiber gel domain includes at least one host polymer component and at least one solvent component, and in further embodiments, each gel includes one or more additional components that provide selected functionality to the gel. Gel functionality can include, for example, ionic conductivity, electrical conductivity, semiconducting conductivity, electrochemical activity, chemical, electrical and/or magnetic sensing, chemical release, as in drug delivery, and other functionalities that are imparted to a gel by the addition of one or more components corresponding to a selected one or more functionalities, as described in detail below.

Further in embodiments provided herein, and referring back to FIGS. 1A, 2A, and 2B, the components of each gel in the fiber and the body material 12 of the fiber are selected in concert to enable the thermal drawing of a preform including each gel and the fiber body material, into a fiber that includes each gel and the fiber body material. The fiber body material and the plurality of different gel domains are co-drawn, under conditions of heat and tension, from a macroscopic preform arrangement, in the manner of conventional optical fiber draw processing, to form a fiber including a plurality of different gel domains that are directly adjacent to and in direct contact with each other in the drawn fiber. In one embodiment, all of the materials included in a fiber, including fiber body material and gel domain components for any selected gel domain functionality, and any other fiber components or materials, are provided in a longitudinally elongated, filamentary fiber form along the fiber length by thermally drawing a fiber preform into the fiber, as described in detail below.

In one embodiment, the thermal drawing of a preform into a fiber including gel domains is accomplished with the provision of at least one glassy, amorphous material for the fiber body material (12 in FIG. 1A). In preferred embodiments, the fiber body material is a thermoplastic polymeric material, and in preferred embodiments, the fiber body material is an electrically insulating polymeric material. Fiber body materials can be provided as, e.g., polyethylene (PE), polypropylene (PP), polyvinylidene chloride (PVDC), polycarbonate (PC), liquid crystal polymer (LCP), polyvinyl chloride (PVC), polyvinylidene chloride (PVDC), cyclic olefin copolymer (COC), polychlorotrifluoroethylene (PCTFE), and other suitable materials. The fiber body material preferably retains both its structural integrity and its chemical composition at the fiber draw temperature. Although the fiber body material may elongate during the fiber draw, the elemental composition of the material in the drawn fiber is the same as the elemental composition of the fiber body material in the preform.

The outer surface of the fiber body material can be coated with an insulating, conducting, or semiconducting material, including, e.g., metals, polymers, ceramics, or other material, either at the preform stage or after thermal drawing. Example coatings include, e.g., Al/LCP, Al/COC, silicon oxide, aluminum oxide, and other suitable materials.

Referring again to FIGS. 1A, 2A, and 2B, in one embodiment, the fiber body material 12 and any coating thereon form the outer surface of the fiber, encircling gel domains, which are at sites within the fiber. In this arrangement, in the transverse cross section of the fiber, the fiber body material is disposed at the outer edge of the fiber along the fiber length, with the gel domains sited interior to the fiber surface and not exposed at the fiber surface, or longitudinal fiber walls, so that the fiber body material covers gel domain edges that are not adjacent to other gel domains or other fiber elements. The outer edge of each gel domain, taken in the transverse fiber cross section, is therefore confined by fiber body material, fiber elements, such as features extending the length of the fiber, and/or other gel domain edges, such as the gel domain interface 18 shown in FIG. 1A.

This arrangement is exploited in embodiments herein to enable thermal drawing of a preform at a draw temperature that is above the gelation temperature of the fiber gels. At a draw temperature above the gelation temperature of the fiber gels, host polymer and solvent components of the gels are mixed together in a homogeneous viscous liquid state. But the fiber body material, adjacent gel domains, and other adjacent fiber elements together function to physically constrain the cross section of each gel domain so that while in the viscous liquid state during thermal fiber draw, each gel is constrained to the site of the gel domain, within the fiber. The gel is thereby encapsulated in the transverse cross section of the fiber by neighboring gels and/or neighboring fiber body material and fiber elements, maintaining each gel domain in place in the fiber, even when in the viscous liquid state during thermal draw of a preform into the fiber in the manner described in detail below.

To obtain a viscous liquid gel state at thermal drawing temperatures, in preferred embodiments, the host polymer component of the fiber gels is provided as polyethylene glycol (PEG), polyethylene oxide (PEO), polyvinylidene fluoride (PVDF), polyacrylonitrile (PAN), polymethyl methacrylate (PMMA), polyvinyl alcohol (PVA), or other suitable polymer material. The solvent component of the fiber gels can be provided as, e.g., ethylene carbonate/propylene carbonate (EC/PC), dimethyl carbonate (DMC), diethyl carbonate (DEC), fluoroethylene carbonate (FEC), ethyl methyl carbonate (EMC), butyrolactone (BL), vinylene carbonate (VC), or other suitable solvent in which the host polymer component of the gel can be homogeneously dissolved.

With these example host polymer and solvent components for a gel, the host polymer and solvent gel components are in a homogeneous viscous liquid state at temperatures above a gelation temperature characteristic of a host polymer-solvent component combination, and form a rubbery solid at temperatures below the characteristic gelation temperature. In embodiments provided herein, there can be included in a gel one or more components that may not mix, or dissolve, with the solvent into the viscous liquid state and/or there can be included in a gel one or more components that may not solidify with the host polymer and solvent below the gelation temperature.

Each gel in the fiber can include solid particulates, solid powders, solid fragments, and in general any population of discrete, nano- to micro-scale masses of solid or of liquid that remain undissolved and individually dispersed in the gel's polymer host-solvent combination when the combination is in the viscous liquid state, e.g., as a population of suspended matter in the viscous liquid state of the host polymer-solvent combination. The solid masses are distributed in the polymer host matrix material when the gel is below the gelation temperature of the gel. Further, each gel in the fiber can include liquids that are dissolved by the solvent in the polymer host-solvent viscous liquid but that remain liquid within the porosity of the gel when the host polymer is in the rubbery state. Thus, when there are included one or more populations of nano- to micro-scale masses of solid or liquid that remain undissolved and individually dispersed in the gel's polymer host-solvent combination when the combination is in the viscous liquid state, the phase separation process just described causes a distribution of the dispersed population in both the host polymer matrix and in any liquid that is disposed in interstices of the gel.

Turning to more considerations of the thermal drawing process, the example host polymer and solvent components described above, and the example fiber body materials given above, can be co-drawn in a thermal drawing process to form a fiber having a plurality of distinct and different gel domains sited across the cross section of the thermally drawn fiber. At a selected temperature, such as a thermal draw temperature, $T_D$, fiber body material included in the fiber can flow, but is not melted. In preferred embodiments, the glass transition temperature of the fiber body material, $T_{GTFB}$, is less than the fiber draw temperature. For many fiber body materials, this condition is met with a fiber body material viscosity that is lower than about $10^8$ Poise at the selected draw temperature. For example, given a polymer fiber body material that is arranged to constitute the majority of a preform volume, then a polymer viscosity of between about $10^3$ Poise and about $10^8$ Poise can be acceptable, with a viscosity of between about $10^4$ Poise and about $10^7$ Poise more preferred, all at the selected fiber draw temperature.

In embodiments provided herein, the fiber draw temperature is above the gelation temperature of each gel to be included in the fiber, so that at the fiber draw temperature, each gel is a viscous liquid. To enable preservation of the gel domain integrity, the fiber body material viscosity, $\mu_{FB}$, is greater than the viscosity of the viscous liquid gel, $\mu_{gel}$, of gel domains at the fiber draw temperature; in other words, $\mu_{FB} > \mu_{gel}$, under the conditions that the fiber draw temperature is greater than the gelation temperature of each gel in the fiber and that the fiber draw temperature is above the glass transition temperature of the fiber body material. The viscosity of fiber elements other than fiber body material is also greater than the viscosity of the viscous liquid gel of gel domains at the fiber draw temperature. With these conditions, the viscous liquid gel of the gel domains is physically constrained to the gel domain in the manner described above.

In preferred embodiments, gels that are disposed in adjacent gel domains of the fiber do not intermix during the thermal fiber draw of the fiber at the thermal fiber draw temperature. In other words, although the polymer host and solvent components of adjacent gels are in a viscous liquid state at the thermal draw temperature, the adjacent gels do not intermix; each viscous liquid gel remains geometrically constrained, relative to adjacent gels, in its intended gel domain during the fiber draw at the thermal draw temperature. This condition is imposed by requiring the viscosity of each gel to be sufficiently high at the thermal draw temperature that adjacent viscous liquid gel components do not undergo flow instability that could cause intermixing. In preferred embodiments, the gel viscosity is between about $10^3$ Poise-about $10^5$ Poise at the thermal draw temperature.

To determine the appropriate viscosity level of each gel for prohibiting gel intermixing at the draw temperature, all components included in each gel can be considered. By selecting for each gel an appropriate ratio of polymer host component, solvent component, and other gel components, each gel's viscosity at the thermal draw temperature is tuned to enable thermal drawing in a viscous liquid state while at the same time prohibiting adjacent gel intermixing. Given one or more populations of components to be included in a gel with a polymer host and solvent, then there can be conducted experimental or simulated trials to determine the optimum fraction of each gel component that satisfies criteria for thermal drawing, for prohibition of adjacent gel mixing, and for intended functionality and performance of each gel in the fiber. Qualitatively, these criteria can be understood as follows. If the fraction of solvent component in a gel is very high, then the viscosity of the gel at the thermal draw temperature would be correspondingly low, possibly allowing for intermixing of adjacent gels. If the fraction of polymer host component in a gel is very high, then the fraction of functional gel components, such as active particles, would be correspondingly need to be reduced to some low fraction, possibly reducing the gel functionality to unworkable levels.

Further, in preferred embodiments, the viscosity of each gel is sufficiently high to prevent flow instability during the thermal draw, but due to the large amount of solvent that is generally present in a gel, the gel viscosity is relatively low, e.g., between about $10^3$ Poise and about $10^5$ Poise at the draw temperature. It is preferred that the difference between the viscosities of two adjacent gels be less than about 10 Poise at the thermal draw temperature. This effectively matches the viscosities at the boundary between the two adjacent gels and prevents mixing between the two adjacent gels.

Figure 3A:
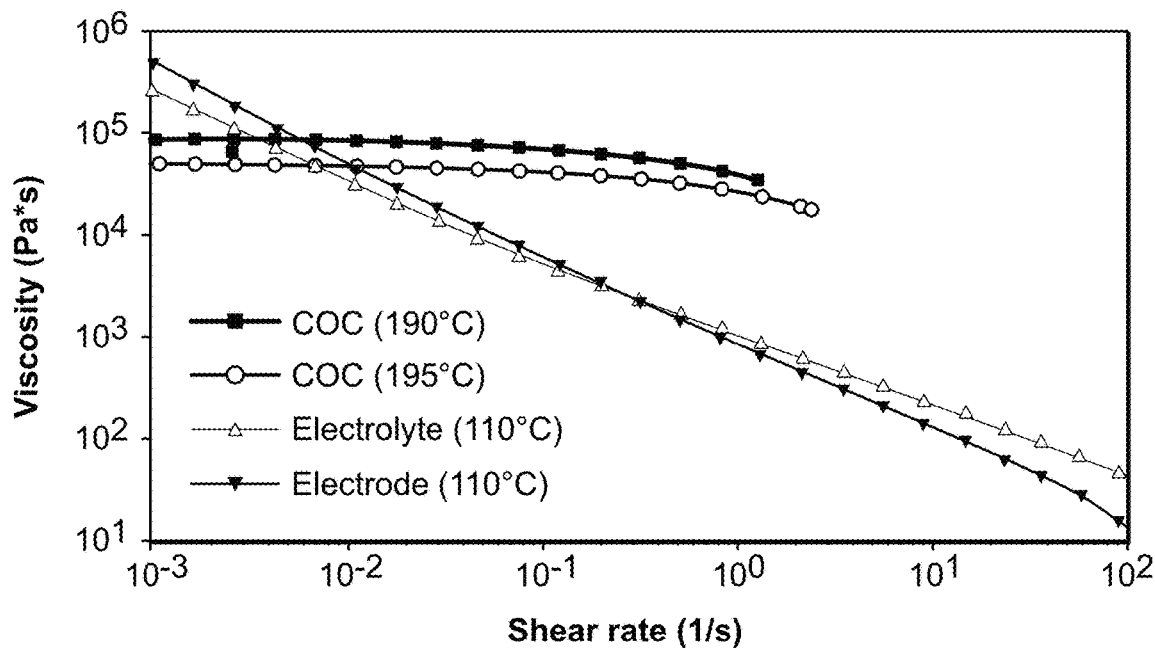
FIG. 3A is a plot of viscosity as a function of shear rate for the polymer COC and for a gel electrolyte and a gel electrode, at three different temperatures.

In addition, the thermal draw temperature and the capstan speed together determine the stress imposed on the gel domains during the fiber draw for given viscosity and draw temperature. FIG. 3A is a plot of viscosity as a function of shear rate for COC fiber body material, electrolyte gel, and electrode gel, at various draw temperatures at which those fiber components are exposed to thermal draw environment. While conventionally the parameter stress is measured in units of force/area, the fiber draw tower tension meter indicates the parameter force, which here will be termed the units for draw stress. The tension meter of the fiber draw tower provides an indication "g" and the fiber dimensions in mm$^2$ are recorded in real time. By dividing the indicated tension by the measured cross-sectional area of the fiber, the resulting value, in units of g/mm$^2$, is an indicator of the quality of the draw. Qualitatively, relatively higher draw temperatures impose lower fiber stresses while relatively higher capstan speeds induce higher fiber stresses. When the fiber tension/fiber area during a thermal draw process is at a value between about 300 g/mm$^2$ and about 1000 g/mm$^2$ the quality of the fiber is good, with little or no gel mixing. A fiber stress that is too low, e.g., <<100 g/mm$^2$ will induce gel mixing and a fiber stress that is too high, e.g., >>1000 g/mm$^2$, will cause fiber break during the fiber draw.

It is noted that herein when referring to the draw temperature in detail below, it is the temperature on the draw tower that is being referred to. The thermal sensor is near the heat source of the draw tower. It is to be recognized that the preform within the draw tower furnace experiences a temperature different than the one referred to by the draw tower sensor. For example, for a draw temperature of between about 180° C.-230° C., the preform experiences a temperature of about 110° C.

In embodiments provided herein, a fiber including gel domains can include non-gel fiber domains, fiber elements, and fiber materials, so long as the non-gel fiber domains, elements, and fiber materials maintain the conditions described for prohibiting intermixing of adjacent gels at the fiber draw temperature. Optical transmission elements, electrical transmission elements, gas and fluid transmission domains, and other features can be included in the fiber, so long as co-drawing at the thermal draw temperature is accommodated. Electrically conducting, electrically semiconducting, and electrically insulating materials, including material layers, segments, wires, filaments, and other features, can be included in the fiber, arranged in any suitable configuration, for example, in the manner taught in U.S. Pat. No. 7,295,734, issued Nov. 13, 2007; and in the manner taught in U.S. Pat. No. 8,863,556, issued Oct. 21, 2014, the entirety of both of which are hereby incorporated by reference. Electrical devices can also be included in the fiber, arranged in any suitable manner and formed of materials that do not flow during thermal drawing of the fiber, for example, with materials and devices in the manner taught in U.S. Patent Application Publication 2018/0039036, published Feb. 8, 2018, the entirety of which is hereby incorporated by reference.

Further, the fiber can include non-gel domains that provide sensing and/or transduction capabilities, enabling, for example, optical sensing, thermal sensing, chemical sensing, piezoelectric-based sensing, and other sensing by a fiber including gel domains. Any suitable fiber-based sensing and transduction materials, devices, and configurations can be included in the fiber for sensing capability, so long as co-drawing at the thermal draw temperature is accommodated. Such sensing and transduction materials, devices, and configurations can be arranged in the fiber in any suitable configuration; for example, in the manner taught in U.S. Pat. No. 7,292,758, issued Nov. 6, 2007; in the manner taught in U.S. Pat. No. 7,567,740, issued Jul. 28, 2009; in the manner taught in U.S. Pat. No. 7,805,029, issued Sep. 28, 2010; in the manner taught in U.S. Pat. No. 8,098,966, issued Jan. 17, 2012; in the manner taught in U.S. Pat. No. 9,365,013, issued Jun. 14, 2016; and in the manner taught in U.S. Patent Application Publication No. 2014/212084, published Jul. 31, 2014; the entirety of each of which is hereby incorporated by reference.

In addition, the fiber can include non-gel domains that provide tailored geometries such as inner fiber filaments, particles, spheres, and high-pressure domains within the fiber, e.g., along the length of the fiber, with materials and arrangements that accommodate thermal drawing of the fiber provided, e.g., in the manner taught in U.S. Pat. No. 9,263,614, issued Feb. 16, 2016; in the manner taught in U.S. Pat. No. 9,512,036, issued Dec. 6, 2016; in the manner taught in U.S. Patent Application Publication No. 2016/0060166, published Mar. 3, 2016; and in the manner taught in U.S. Pat. No. 10,112,321, issued Oct. 30, 2018, the entirety of each of which is hereby incorporated by reference.

Figure 3B:
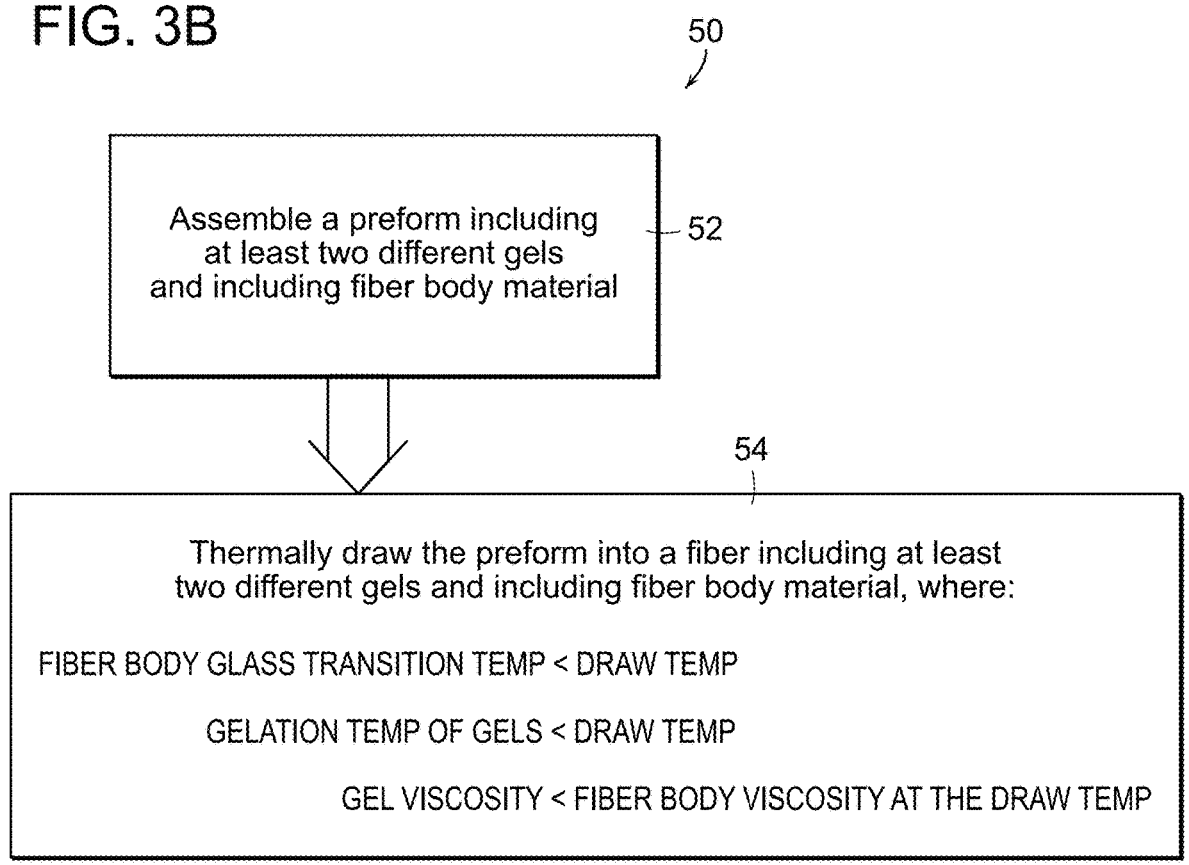
FIG. 3B is a flow diagram of the steps in a method provided herein for producing a fiber including two different gel domains.

Referring to FIG. 3B, whatever fiber geometry and functionality is selected, then for a corresponding combination of fiber body material, gel domain components, and other fiber materials, elements, and features, the fiber is produced in one embodiment in a process 50 in which in a first step 52, a preform is assembled. The resulting preform assembly includes at least two different gels and includes a fiber body material, all arranged in any suitable manner for a selected fiber application. Then in a second step 54, the preform is thermally drawn into a fiber. The resulting thermally drawn fiber includes at least two different gels and includes fiber body material. The thermal drawing temperature is selected so that the glass transition temperature of the fiber body material, $T_{GTFB}$, is less than the temperature at which the fiber is thermally drawn, and so that the gelation temperature of each of the gels is less than the temperature at which the fiber is thermally drawn. At the thermal draw temperature, the viscosity of the gels is less than the fiber body material viscosity. Under these conditions, the preform is thermally drawn into a fiber including a plurality of different gel domains arranged with fiber body material.

With this fiber production method and with the gel domain characteristics given above, the combination of co-drawable fiber body materials and gel domains in a thermally-drawn fiber as provided herein enables a wide range of fiber-based gel structures for many applications. Any suitable additives can be incorporated in the fiber gels to achieve selected fiber functionality. Applications such as energy supply, electrochromic display, actuation, dye-sensitized solar cell operation, drug delivery, and other applications can be addressed.

Figure 4A:
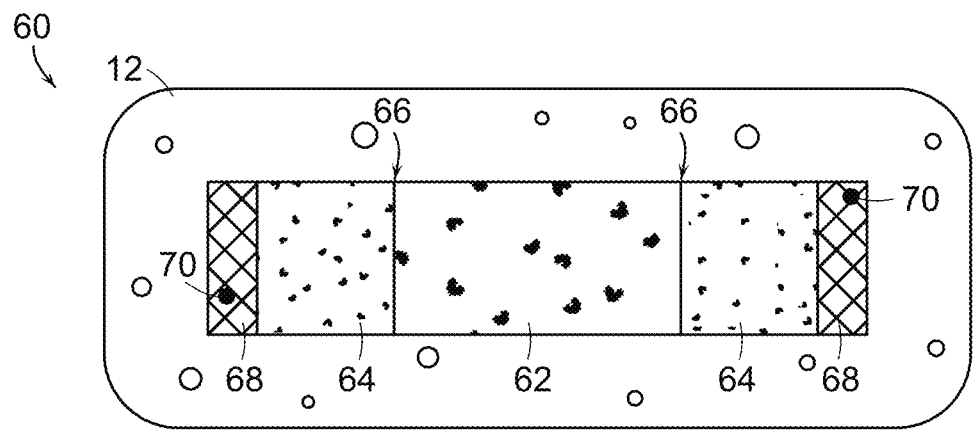
FIGS. 4A and 4B are a transverse cross-sectional view and a longitudinal cross-sectional view, respectively, of a fiber supercapacitor provided herein and including three adjacent gel domains within the fiber body.
Figure 4B:
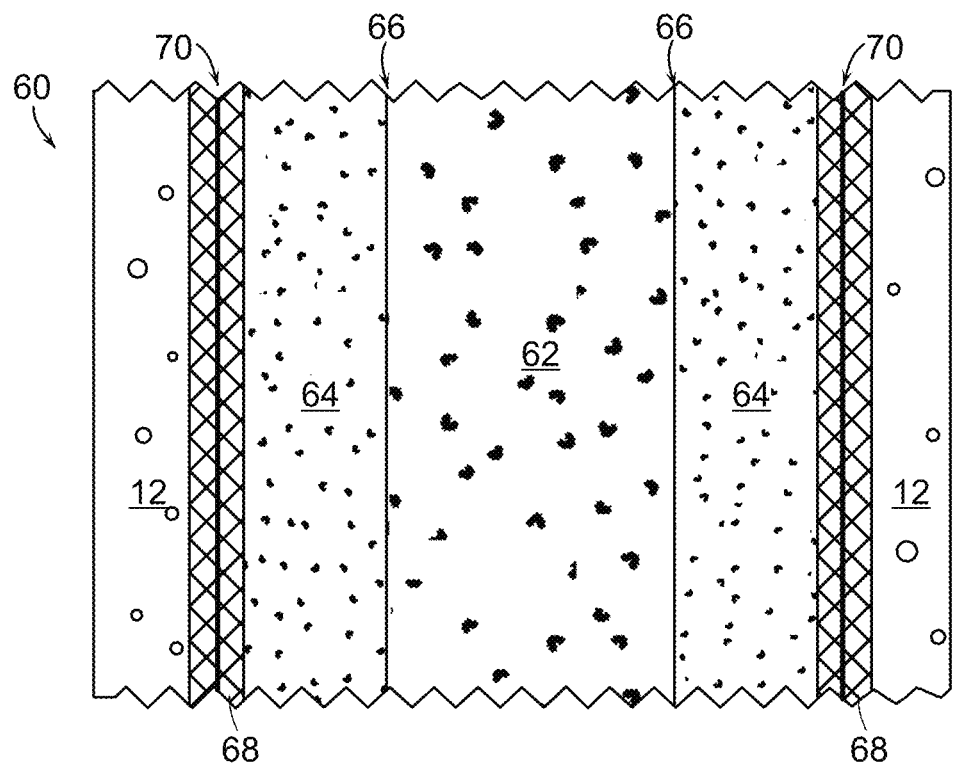

In one embodiment, there is provided herein a fiber supercapacitor including fiber body material and fiber gel domains that form components of the fiber supercapacitor. Referring to FIGS. 4A-4B, in one example of such, shown in transverse cross section and longitudinal cross section, respectively, a fiber supercapacitor 60 includes an electrolyte gel domain 62 that is bounded in the plane of the transverse cross-section by matching electrochemically active electrode gel domains 64. Each of the electrochemically active electrode gel domains is directly adjacent to and in direct contact with the electrolyte gel domain 62 at a gel-gel domain interface 66. An electrical contact 68 is disposed directly adjacent to and in contact with each of the electrochemically active electrode gel domains 64. An electrical current conductor 70 is disposed within or adjacent to each electrical contact 68. Fiber body material 12 is disposed around the transverse cross sectional edges of the supercapacitor arrangement.

The fiber supercapacitor 60 is an electrochemical capacitor that stores energy at the interface between the electrolyte and the electrochemically active electrode gel domains of the fiber, as an electric double layer capacitor (EDLC). Specifically, energy is stored through the absorption/desorption of closed-spaced opposing charges. Supercapacitors are widely used to power portable electronics, large-scale transportation vehicles, and other devices, given their rapid charge/discharge ability and ultra-long cycle life. EDLC capacitors, being electrochemical in nature, are particularly well-suited for applications demanding higher power and longer cycle life than can be achieved with a battery, and for applications demanding greater energy density than can be achieved with electrolytic capacitors. Conventional, macroscale commercial supercapacitors utilize activated carbon (AC) derived from coconut shell as an active material because of its reliable performance and competitive cost. Even though high performance carbon materials with precisely controlled microstructures and nanostructures have been identified, the supercapacitor market is very sensitive to the price, and in general, premium carbon materials for micro- and nano-scale devices cannot compete with conventional activated carbon due to cost.

The fiber supercapacitor provided herein is well-suited for such micro-scale and nano-scale systems, given that the fiber is light, flexible, very small in transverse cross section, and in general, ubiquitous in daily life. The preform-to-fiber thermal drawing process provided herein is intrinsically scalable and flexible in material selection, does not require manual assembly of the supercapacitor device at the fiber scale. Rather, a centimeter-scale preform including multiple materials in a supercapacitor geometry is scaled down by the thermal draw process herein to produce a fiber supercapacitor having dimensions provided by the supercapacitor preform design. The fiber length increases as the square of the draw down ratio, providing kilometer-long fiber supercapacitor lengths for a relatively small preform arrangement, and can include a wide range of materials including electrically insulating, electrically conducting, and electrically semiconducting materials.

As a result, multiple fiber supercapacitors can be arranged with various electronic elements and connected in series and parallel circuit configurations, and as such can be woven into textiles and other fabric forms; the fiber supercapacitor length is comparable with traditional textile fiber lengths, enabling machine weavability while simultaneously providing energies equivalent to conventional energy storage system. Further, the fiber supercapacitor not only must provide effective energy storage and release for a textile application but also must be stable to the myriad conditions that textiles encounter in everyday use. The fiber supercapacitor architecture meets these demands by providing high power output, long cycle life, and high immunity to environmental conditions, such as humidity, as compared to conventional lithium-ion battery chemistries; indeed, the fiber supercapacitor retains its electrochemical behavior even in harsh conditions such as mechanical deformation and submersion in water. The fiber supercapacitor thereby provides a high-performance, extended-length, mechanical flexible, weavable energy storage fiber that addresses a wide range of energy storage applications.

In embodiments provided herein, the fiber supercapacitor is arranged with each gel domain including host polymer, solvent, and additive components to provide corresponding functionality for that gel domain. The electrolyte gel domain 62 of the fiber supercapacitor includes a host polymer, solvent, and a selected salt. Example electrolyte gel host polymer materials include polyethylene glycol (PEG), a polyethylene oxide (PEO), polyvinylidene fluoride (PVDF), polyacrylonitrile (PAN), polymethyl methacrylate (PMMA), or other suitable host polymer material. The solvent in the electrolyte gel can be provided as, e.g., dimethyl carbonate (DMC), diethyl carbonate (DEC), fluoroethylene carbonate (FEC), ethyl methyl carbonate (EMC), butyrolactone (BL), ethylene carbonate/propylene carbonate (EC/PC) or other suitable material. The salt for ion conduction in the electrolyte gel can be provided as, e.g., LiX where X=I, Cl, Br, $ClO_4$, $CF_3SO_3$, $PF_6$, $BF_4$, or $AsF_6$; NaX where X=I, Cl, Br, $ClO_4$, $CF_3SO_3$, $PF_6$, $BF_4$, or $AsF_6$; MgX where X=$(CF_3SO_3)_2$ or $(AlCl_3\text{-}xRx')_2$ wherein R, R'=an alkyl group; and AlX where X=$(CF_3SO_3)_3$, $Cl_3$/[EMIm]Cl, or other suitable group. With the addition of a salt solution to the gel composition, the liquid within the pores of the gel is ionically conducting and therefore provides in situ, a liquid electrolyte that is disposed in the interstices of the polymer host matrix.

In the electrolyte gel, the solvent component can include and/or be provided as an ionic liquid, as a mixture of anions and cations. Examples of suitable cationic fluids include 1-ethyl-3-methylimidazolium (EMI), 1-butyl-3-methylimidazolium (BMI), N-Propyl-N-methylpyrrolidinium (PYR13), 1-Butyl-1-methylpyrrolidinium (PYR14), Tetraethylammonium (Et4N); examples of suitable anionic fluids include chloride (Cl), bromide (Br), tetrafluoroborate (BF4), hexafluorophosphate (PF6), bis(fluorosulfonyl)imide (FSI), and bis(trifluoromethylsulfonyl)imide (TFSI). In one preferred embodiment, the electrolyte gel includes 1 M bis(trifluoromethane)sulfonamide lithium salt in EC/PC. Electrolyte gel additives can additionally be included, e.g., as $ZrO_2$, $TiO_2$, $Al_2O_3$, $SiO_2$, or other suitable additive.

The electrochemically active electrode gel domains 64 of the fiber supercapacitor 60 (FIGS. 4A-4B) include a host polymer, a solvent, an electrically conducting species, and a selected salt, thereby providing an ionically and electrically conducting gel electrode that is an electrochemically active gel. In one embodiment, a host polymer, a solvent, a salt, and if desired, an additive, all selected from the example compounds given just above, are combined along with an electrically conductive species, such as activated carbon particles, carbon nanotubes, graphene, metal carbides such as silicon carbide, titanium carbide, tungsten carbide, or other carbide; manganese oxide ($MnO_2$), titanium oxide, silicon oxide, or other suitable species, to form an electrochemically active gel electrode. This gel composition for the electrochemically active electrodes overcomes the limitations of conventional activated carbon electrodes, in that the high particle loadings required for conventional activated carbon electrodes are not compatible with the thermal drawing process. In particular, particle aggregation at high loading levels leads to inhomogeneous thermomechanical behavior, causing fiber breakage during the draw. The gel architecture of the electrochemically active gel electrodes provided herein have thermomechanical properties that are conducive to the fiber draw process while concomitantly maximizing the areal energy density of the resulting fiber supercapacitor.

With this supercapacitor gel domain architecture, the fiber supercapacitor includes an electrolyte gel domain that includes electrolytic fluid in interstices of a polymer host matrix and includes electrochemically active electrode gel domains that include electrolytic fluid in interstices of a polymer host matrix. The electrolytic fluid arrangement with the porous gel host matrix is produced in situ, during the gel phase separation that occurs as the fiber cools from the thermal draw temperature. No additional electrolytic fluid need be provided to the fiber; as-drawn, the fiber supercapacitor includes all components needed for operation.

At the fiber draw temperature, the electrolyte gel domain and the electrochemically active electrode gel domains are all in a viscous liquid state, but do not intermix, due to the degree of viscosity of the gel domains that results from the percentage fraction of each of the components in the adjacent gels. In one example embodiment that prohibits gel intermixing during the fiber draw, the supercapacitor electrolyte gel includes between about 7 wt % and about 45 wt % PVDF as the host polymer component, includes between about 45 wt % and about 60 wt % EC/PC as the solvent, and includes between about 10 wt % and about 15 wt % 1M LiTFSI as the electrolyte salt. The electrochemically active gel electrodes include between about 5 wt % and about 15 wt % PVDF as the host polymer component, include between about 55 wt % and about 65 wt % EC/PC as the solvent, and include between about 10 wt % and about 15 wt % 1M LiTFSI as the electrolyte salt. The electrochemically active gel electrodes here include between about 10 wt % and about 20 wt % activated carbon, and include between about 1 wt % and about 5 wt % carbon black. With these component fractions, the fiber supercapacitor electrolyte gel and electrochemically active electrode gels all have viscosities, at a fiber drawing temperature between about 170° C. and about 230° C., of between about $10^2$ Poise and about $10^5$ Poise.

These component fractions also produce electrochemical activity characterized by ion conduction of between about $10^{-5}$ S/cm and about $10^{-3}$ S/cm in all of the fiber supercapacitor electrolyte gel and electrode gel domains, and electron conduction of between about $10^{-2}$ S/cm and about $10^2$ S/cm in the electrochemically active electrode gel domains and between about $10^{-15}$ S/cm and about $10^{-8}$ S/cm in the electrolyte gel domain. The gel compositions thereby provide sufficient electrochemical activity for fiber supercapacitor operation.

Adjacent to each electrochemically active electrode gel, there is disposed in the fiber supercapacitor an electrical contact (68 in FIGS. 4A-4B). In one embodiment, the electrical contact is a thermoset polymer that is electrically conducting, such as conducting polyethylene (CPE), or a suitable mixture of thermoset polymer and an electrically conducting agent. Example suitable polymers include PC, PP, PVC, and example suitable conducting agents include carbon black, graphite, carbon nanotubes, graphene, and metal particles.

An electrical current collector (70 in FIGS. 4A-4B) is provided in contact with each electrical contact in the fiber supercapacitor to make electrical connection to the supercapacitor from one or both ends of the fiber. In one embodiment, the electrical current collectors are electrically conducting filaments, wires, strands, ribbons, or other suitable arrangement in contact with the supercapacitor contacts. If the electrical current collector is a material have a melting point temperature that is lower than the fiber draw temperature, then the current collector material is in a liquid state during the thermal draw. Suitable examples of such current collector materials include, BiInSn, BiPbSn, InSn, and InCd, all of which are in a melted liquid state at the fiber draw temperature. In this embodiment, the current collector material is encapsulated, in the transverse cross section of the fiber, so that the melted current collector material is confined during the fiber draw. One example of this confinement configuration is shown in FIGS. 4A-4B, in which the current collectors 70 are disposed within the supercapacitor electrical contact regions; the electrical contact material encircles the current collector in the transverse cross section of the fiber so that the current collector is maintained in its intended location upon completion of the draw.

In an alternative embodiment, the current collector is provided as a material having a melting point temperature that is higher than the fiber draw temperature, whereby the current collector material cannot be melted during the fiber draw. In this embodiment, each current collector wire, filament, strand, or other current collector element to disposed within the fiber supercapacitor, e.g., within the region of the supercapacitor electrode contact, is fed into a hole in the preform during the fiber supercapacitor draw. In this embodiment, wires including tungsten Cu, Al, Ti, Ni, stainless steel, or other suitable electrical conductor, here can be employed.

With these example supercapacitor gel domain components, electrical contact materials, and electrical current collector materials, the fiber supercapacitor body material can be provided as, e.g., polyethylene (PE), polypropylene (PP), polyvinylidene chloride (PVDC), polycarbonate (PC), liquid crystal polymer (LCP), polyvinyl chloride (PVC), cyclic olefin copolymer (COC), or other suitable materials.

Figure 5A:
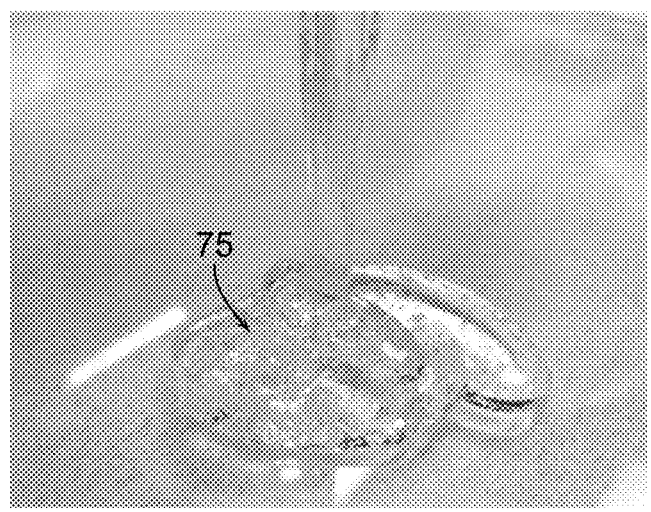
FIGS. 5A-5C are a photo of a supercapacitor electrolyte gel in the viscous liquid phase, a photo of a supercapacitor electrolyte gel in the rubbery solid phase, and a schematic perspective view of a section of the supercapacitor electrolyte gel in the rubbery solid phase, respectively.
Figure 5B:
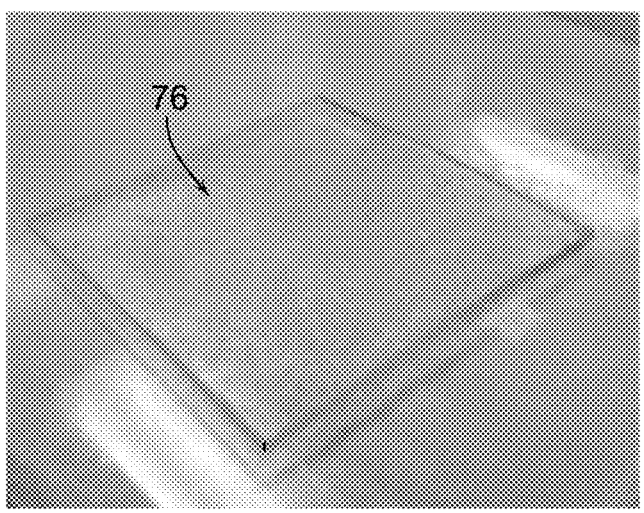
Figure 5C:
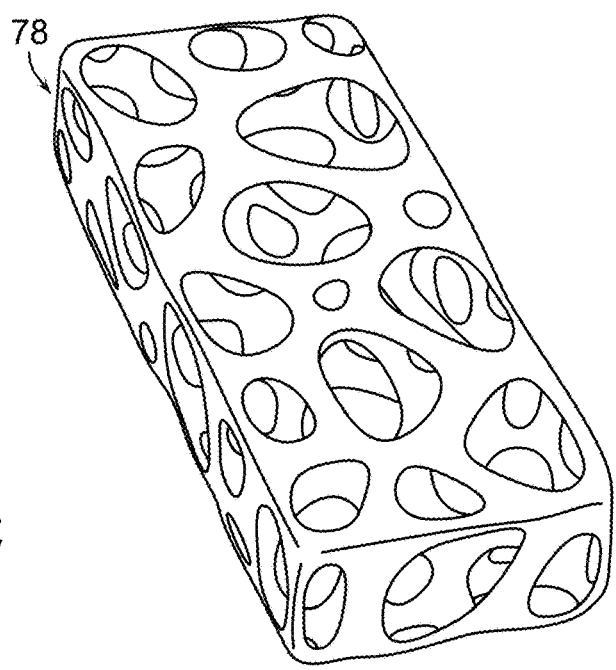
Figure 5D:
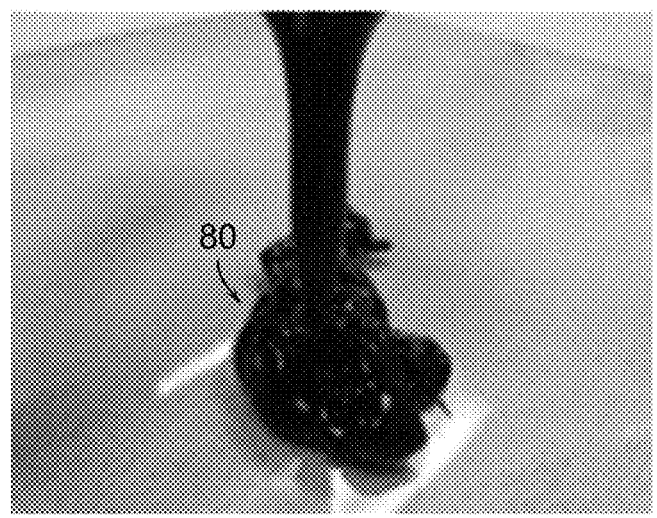
FIGS. 5D-5F are a photo of an electrochemically active electrode gel in the viscous liquid phase, a photo of an electrochemically active electrode gel in the rubbery solid phase, and a schematic perspective view of a section of the electrochemically active electrode gel in the rubbery solid phase, respectively.
Figure 5E:
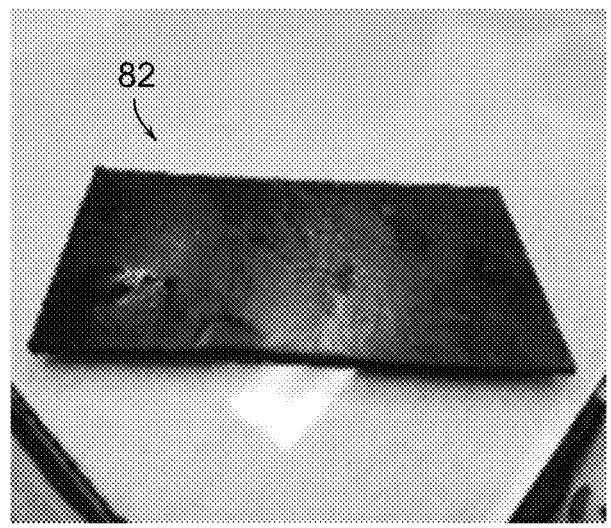
Figure 5F:
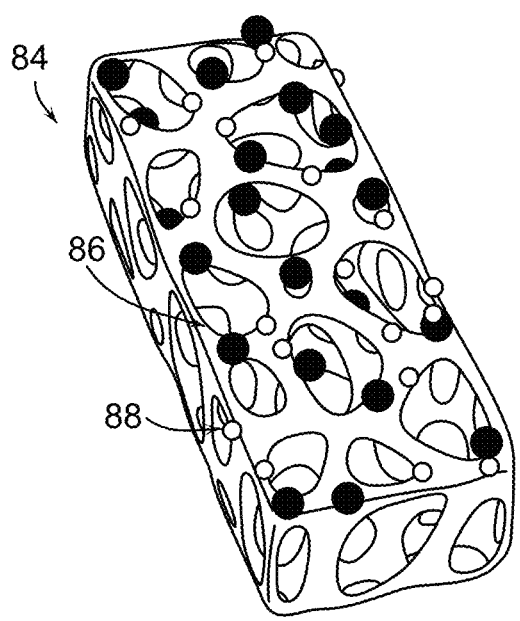

Turning to production of the fiber supercapacitor, in one fiber supercapacitor production embodiment, first a preform is configured with supercapacitor gels and other elements as-desired for thermal drawing into the fiber supercapacitor. An electrolyte gel element and electrochemically active electrode gel elements for the preform are produced in one example by mixing the gel components at a temperature above the gelation temperature and then cooling the mixed gel components in a shape suitable for producing pre-form elements. For example, referring to FIGS. 5A-5C, the electrolyte gel components can be mixed in the viscous liquid state and the resulting liquid electrolyte gel 75 poured onto a flat surface and cooled below the gelation temperature to form a rubbery electrolyte gel slab 76, having an interconnected pore structure 78, and from which can be cut, molded, or otherwise fashioned, an electrolytic gel domain element for the preform. The schematic image of the gel 78 in FIG. 5C is a "dried" gel image; it is to be recognized that liquid fills the interstices of the structure. Referring to FIGS. 5D-5F, similarly, the electrochemically active electrode gel components can be mixed in the viscous liquid state and the resulting liquid electrode gels 80 poured onto a flat surface and cooled below the gelation temperature to form a rubbery electrode gel slab 82, having an interconnected pore structure 84, including activated carbon particles 86 and carbon black particles 88, and having liquid filling interstices, and from which can be cut electrode gel domain elements for the preform.

Figure 6A:
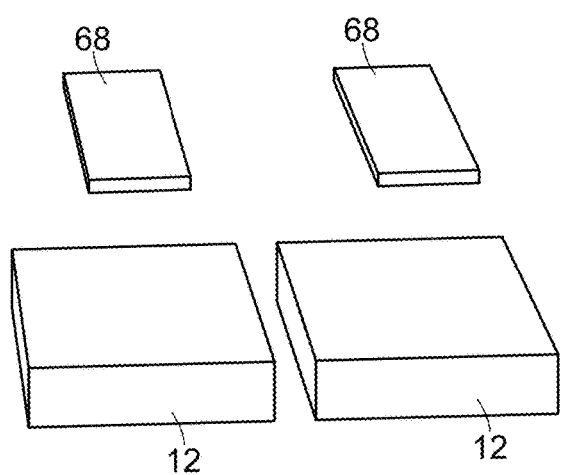
FIGS. 6A-6D are schematic perspective views of preform materials and arrangements for producing a fiber including two adjacent gels as provided herein.
Figure 6B:
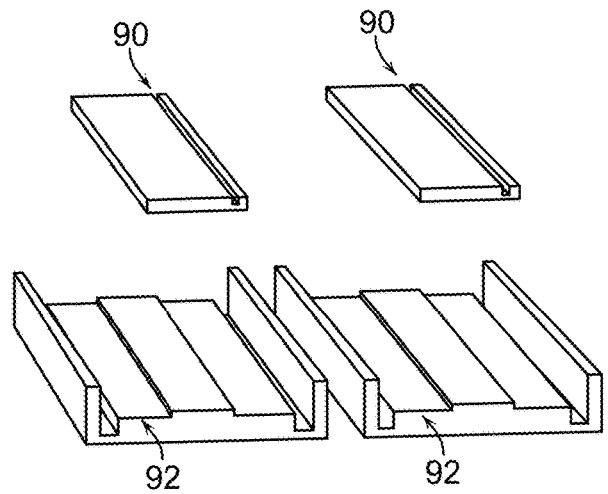
Figure 6C:
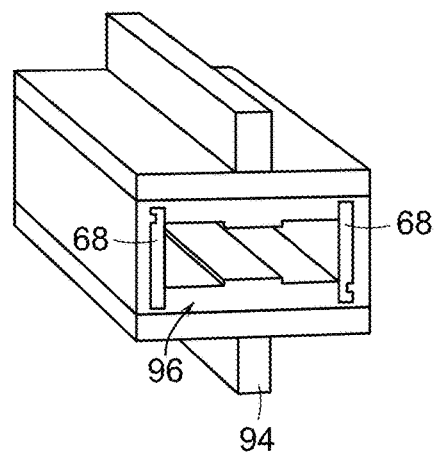
Figure 6D:
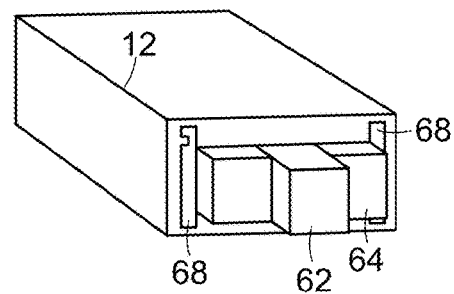

Referring now to FIGS. 6A-6D, in one example method for producing a fiber supercapacitor preform, pieces of fiber body material 12 and sheets of electrical contact material 68 are machined in any suitable manner with dimensions corresponding to desired fiber capacitor dimensions, for a given thermal draw process. Any suitable cross-sectional fiber geometry can be employed, including generally rectangular, generally circular, or other geometry. The electrical contact material sheets can include a channel 90 into which electrical current collectors can be disposed, either in the preform, or during the fiber draw. The fiber body material pieces can be further machined to include features 92 corresponding to the siting of gels within the preform. As shown in FIG. 6C, the pieces of fiber body material 12 and the sheets of electrode material 68 are then arranged in a selected configuration, and can be consolidated, under mechanical pressure, e.g., a clamp 94, to produce a preform having a slot 96 for supercapacitor gels. The electrical contact pieces can protrude out of one end at the surface so that partial removal of fiber body material is not required to make electrical connection to the current collectors within the fiber body material. After consolidation, then as shown in FIG. 6D, an electrolyte gel domain 62 and two adjacent electrochemically active electrode gel domains 64 are inserted in the preform slot 96. It can be preferred to conduct the gel domain insertion in a glovebox, e.g., with Ar flowing. One end of the preform is closed off with fiber body material and then after gel domain insertion, the open end of the preform is sealed, e.g., with polyimide tape and chemically resistant epoxy. With this arrangement, the preform can be thermally drawn into a fiber supercapacitor.

Figure 7:
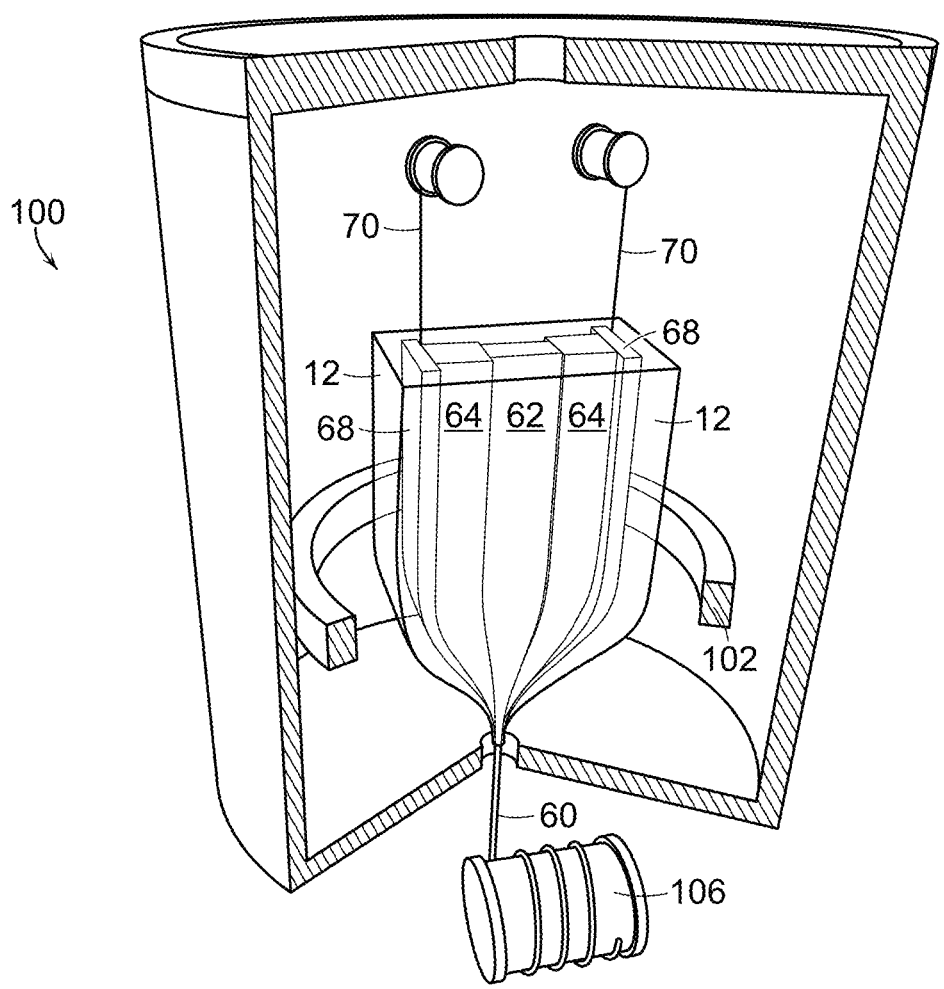
FIG. 7 is a schematic perspective view of a thermal draw tower including a preform being thermally drawn into a fiber supercapacitor as provided herein.

As shown in FIG. 7, thermal drawing of the preform into a fiber supercapacitor is conducted in a fiber draw tower 100, e.g., having conventional three-zone heating, with a middle zone 102 being that zone which sets the thermal draw temperature. The preform, including electrolyte gel 62, electrochemically active electrode gels 64, electrical contacts 68, and fiber body material 12, is provided in the draw tower and in one embodiment, spools of electrical current collector wire 70 are configured for feeding electrical current collectors into the preform channels provided for the wire.

In one example drawing process, there is provided a three-zone fiber draw heating arrangement with atop-zone temperature of about 90° C., a middle-zone temperature of between about 170° C. and about 230° C., and a bottom-zone temperature of about 60° C., with a draw down ratio of about 30. A middle zone temperature of between about 170° C. and about 230° C. can be applicable for many material configurations, based on the selected fiber body material in which the gel domain battery components are disposed. The drawn fiber dimensions can be monitored during drawing, e.g., with laser-micrometers, and the atmosphere draw tower furnace can be maintained as-desired, e.g., under constant nitrogen gas purge. A particular advantage of this thermal drawing process is that the transverse cross sectional dimensions of the fiber, including the cross sectional dimensions of the gel domains, can be controlled by changing the capstan, or spool, speed, and without changing the preform.

As the preform is drawn under tension at the thermal draw temperature, the preform necks down and forms a fiber supercapacitor 60 that includes all of the supercapacitor elements of the preform, with the supercapacitor configuration of the preform preserved in the fiber supercapacitor 60 as-drawn. The drawn fiber supercapacitor exhibits mechanical flexibility as-drawn and can be spooled, e.g., on a storage spool 106, as kilometers of the fiber supercapacitor are produced. The fiber supercapacitor can therefore be produced in any arbitrary length while exhibiting outstanding electrochemical performance, for addressing a wide range of smart structures and rechargeable fiber-based and textile-based electrical systems.

Figure 8A:
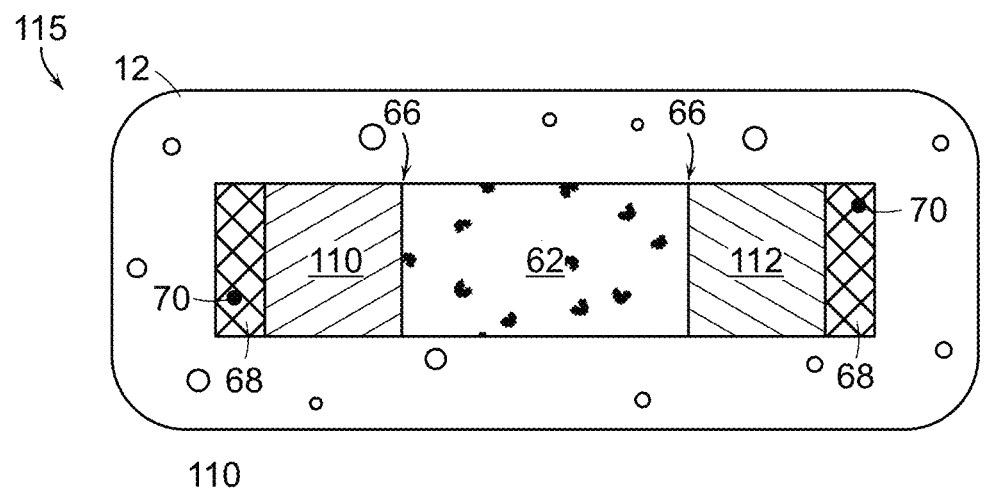
FIGS. 8A and 8B are a transverse cross-sectional view and a longitudinal cross-sectional view, respectively, of a fiber battery provided herein and including three adjacent gel domains within the fiber body.
Figure 8B:
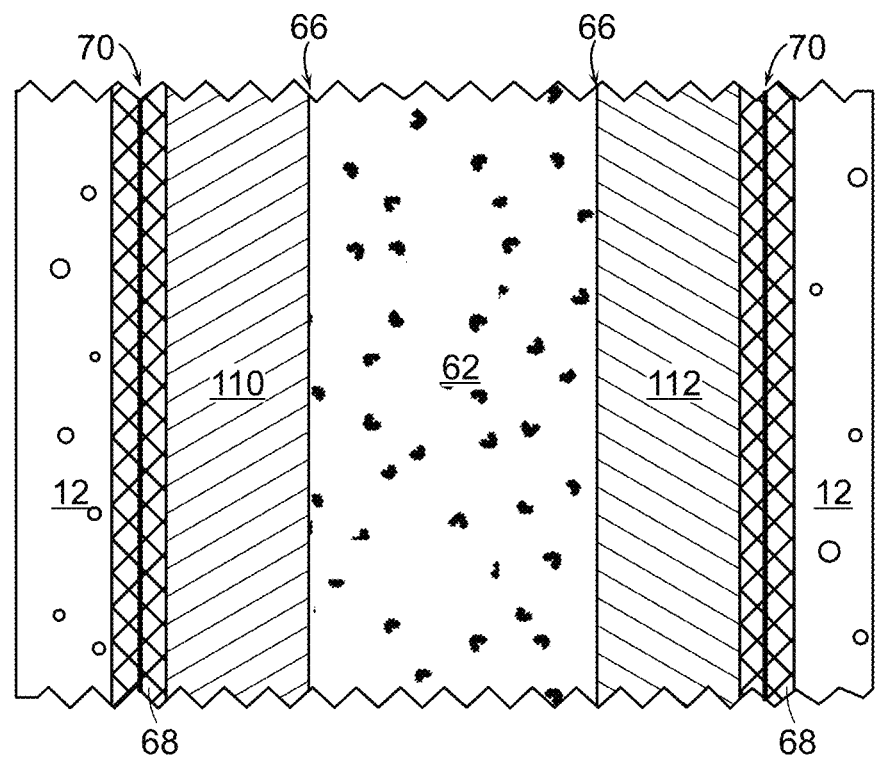

In a further embodiment enabled by different fiber-based gel domains, there is provided herein a fiber battery including fiber body material and fiber gel domains that form components of the fiber battery. Referring to FIGS. 8A-8B, in one example of such, shown in transverse cross section and longitudinal cross section, respectively, a fiber battery 115 includes an electrolyte gel domain 62 that is bounded in the plane of the transverse cross-section by an electrochemically active anode gel domain 110 and an electrochemically active cathode gel domain 112. Each of the anode and cathode gel domains 110, 112 is directly adjacent to and in direct contact with the electrolyte gel domain 62 at a gel-gel domain interface 66. An electrical contact 68 is disposed directly adjacent to and in contact with each of the electrochemically active anode and cathode gel domains 110, 112. An electrical current conductor 70 is disposed within or adjacent to each electrical contact 68. Fiber body material 12 is disposed around the transverse cross sectional edges of the gel battery arrangement.

With this arrangement, the fiber battery overcomes the prohibitive limitations that conventional battery materials present for thermal fiber drawing. In general, the thermo-mechanical and rheological properties of battery active materials do not lend themselves to accommodation of a thermal drawing process. Typical battery active materials have very high melting points or physically degrade prior to melting, and conventional composite-material battery electrodes generally have such a high level of particle loading that the electrode regions cannot be thermally drawn. The gel-based fiber battery provided herein includes electrochemically active anode and cathode gel domains that are physically separated in the fiber battery configuration yet are compatible with thermal drawing processes. This enables production of arbitrarily long lengths of fiber battery for use in a range of applications.

In embodiments provided herein, the fiber battery is arranged with each gel domain including host polymer, solvent, and additive components to provide corresponding functionality for that gel domain. The electrolyte gel domain 62 of the fiber battery includes a host polymer, solvent, and a selected salt. Example electrolyte gel host polymer materials include polyethylene glycol (PEG), a polyethylene oxide (PEO), polyvinylidene fluoride (PVDF), polyacrylonitrile (PAN), polymethyl methacrylate (PMMA), or other suitable host polymer material. The solvent in the electrolyte gel can be provided as, e.g., dimethyl carbonate (DMC), diethyl carbonate (DEC), fluoroethylene carbonate (FEC), ethyl methyl carbonate (EMC), butyrolactone (BL), ethylene carbonate/propylene carbonate (EC/PC) or other suitable material. The salt for ion conduction in the electrolyte gel can be provided as, e.g., LiX where X=I, Cl, Br, $ClO_4$, $CF_3SO_3$, $PF_6$, $BF_4$, or $AsF_6$; NaX where X=I, Cl, Br, $ClO_4$, $CF_3SO_3$, $PF_6$, $BF_4$, or $AsF_6$; MgX where X=$(CF_3SO_3)_2$ or $(AlCl_3\text{-}xRx')_2$ wherein R, R'=an alkyl group; and AlX where X=$(CF_3SO_3)_3$, $Cl_3$/[EMIm]Cl, or other suitable group.

In the electrolyte gel, the solvent component can include and/or be provided as an ionic liquid, as a mixture of anions and cations. Examples of suitable cationic fluids include 1-ethyl-3-methylimidazolium (EMI), 1-butyl-3-methylimidazolium (BMI), N-Propyl-N-methylpyrrolidinium (PYR13), 1-Butyl-1-methylpyrrolidinium (PYR14), Tetraethylammonium (Et4N); examples of suitable anionic fluids include chloride (Cl), bromide (Br), tetrafluoroborate (BF4), hexafluorophosphate (PF6), bis(fluorosulfonyl)imide (FSI), and bis(trifluoromethylsulfonyl)imide (TFSI). In one preferred embodiment, the electrolyte gel includes 1 M bis(trifluoromethane)sulfonamide lithium salt in EC/PC. Electrolyte gel additives can additionally be included, e.g., as $ZrO_2$, $TiO_2$, $Al_2O_3$, $SiO_2$, or other suitable additive.

The electrochemically active anode and cathode gel domains 110, 112 of the fiber battery 115 (FIGS. 8A-8B) each include a host polymer, a solvent, an electrically conducting species, and a source of ions, thereby providing an ionically and electrically conducting gel that is an electrochemically active anode or cathode. The electrochemically active anode and cathode gel materials are therefore in general selected to employ a selected ion, e.g., lithium or other ion. The electrochemically active cathode gel can include a suitable material such as lithium-nickel cobalt manganese oxide (NMC) of various ratios, lithium cobalt oxide (LCO), lithium manganese oxide (LMO), lithium nickel cobalt aluminum oxide (NCA), lithium iron phosphate (LFP), lithium iron sulphate fluoride (LFSF), lithium titanium sulfide (LTS), sodium vanadium phosphate fluoride (NVSF), sodium iron phosphate (NFP), magnesium cobalt oxide (MCO), magnesium scandium selenide (MSS), magnesium indium sulfide (MIS), aluminum vanadium oxide (AVO), iron fluoride (FeFx), cobalt fluoride (CoFx), iron chloride (FeClx), sulfur (S), lithium sulfide (Li2Sx), Selenium (Se), Te (tellurium), iodine (I), lithium iodide (LiI), carbon and other suitable materials. The electrochemically active anode gel can include a suitable active material such as lithium, lithium titanate (LTO), sodium, magnesium, aluminum, graphite, CNT, graphene, silicon, germanium, tin, lithium oxide, or other suitable material.

In one embodiment, a host polymer, a solvent, a salt, and if desired, an additive, all selected from the example compounds given just above, are combined along with an electrically conductive species, carbon black, to form an electrochemically active gel anode or cathode. With this gel domain architecture, the fiber battery thereby includes an electrolyte gel domain that includes electrolytic fluid in interstices of a polymer host matrix and includes electrochemically active anode and cathode gel domains that include electrolytic fluid in interstices of a polymer host matrix. The electrolytic fluid arrangement with the porous gel host matrix is produced in situ, during the gel phase separation that occurs as the fiber cools from the thermal draw temperature. No additional electrolytic fluid need be provided to the fiber; as-drawn, the fiber battery includes all components needed for operation.

At the fiber draw temperature, the electrolyte gel domain and the electrochemically active anode gel domain and cathode gel domain are all in a viscous liquid state, but do not intermix, due to the degree of viscosity of the gel domains that results from the percentage fraction of each of the components in the adjacent gels. In one example embodiment that prohibits gel intermixing during the fiber draw, the battery electrolyte gel includes between about 7 wt % and about 45 wt % PVDF as the host polymer component, includes between about 45 wt % and about 60 wt % EC/PC as the solvent, and includes between about 10 wt % and about 15 wt % 1M LiTFSI as the electrolyte salt. The electrochemically active gel anode and cathode include between about 5 wt % and about 15 wt % PVDF as the host polymer component, include between about 55 wt % and about 65 wt % EC/PC as the solvent, and include between about 10 wt % and about 15 wt % 1M LiTFSI as the electrolyte salt. The electrochemically active gel anode additionally includes between about 10 wt % and about 20 wt % lithium titanate (LTO), and between about 1 wt % and about 5 wt % carbon black. The electrochemically active gel cathode additionally includes between about 10 wt % and about 20 wt % lithium-iron phosphate (LFP), and between about 1 wt % and about 5 wt % carbon black. With these component fractions, the electrolyte gel and electrochemically active anode and cathode gels all have viscosities, at a fiber drawing temperature between about 170° C. and about 230° C., of between about $10^2$ Poise and about $10^5$ Poise.

In one embodiment, the anode gel includes 10.2 wt % PVDF as the host polymer component, includes 61.2 wt % EC/PC as the solvent, and includes 1.3.9 wt % LiTFSI as the electrolyte salt. 12.8 wt % LTO particles and 1.9 wt % carbon black particles are included in the anode gel. In this embodiment, the cathode gel includes 10.2 wt % PVDF as the host polymer component, includes 61.2 wt % EC/PC as the solvent, and include 13.9 wt % LiTFSI as the electrolyte salt. 12.8 wt % LFP particles and include 1.9 wt % carbon black particles are included in the cathode gel.

These component fractions produce electrochemical activity characterized by ion conduction of between about $10^{-5}$ S/cm and about $10^{-3}$ S/cm in all of the fiber battery electrolyte gel domain, anode gel domain, and cathode gel domain, and electron conduction of between about $10^{-2}$ S/cm and about $10^2$ S/cm in the electrochemically active fiber battery anode and cathode gel domains and between about $10^{-15}$ S/cm and about $10^{-8}$ S/cm in the fiber battery electrolyte gel domain. The gel compositions thereby provide sufficient electrochemical activity for fiber battery operation.

Adjacent to the electrochemically active anode and the electrochemically active cathode of the fiber battery, there is disposed an electrical contact (68 in FIGS. 8A-8B). In one embodiment, the electrical contact is a thermoset polymer that is electrically conducting, such as conducting polyethylene (CPE), or a suitable mixture of thermoset polymer and an electrically conducting agent. Example suitable polymers include PC, PP, PVC, and example suitable conducting agents include carbon black, graphite, carbon nanotubes, graphene, and metal particles.

An electrical current collector (70 in FIGS. 8A-8B) is provided in contact with each electrical contact in the fiber battery to make electrical connection to the battery from one or both ends of the fiber. In one embodiment, the electrical current collectors are electrically conducting filaments, wires, strands, ribbons, or other suitable arrangement in contact with the battery contacts. If the electrical current collector is a material having a melting point temperature that is lower than the fiber draw temperature, then the current collector material is in a liquid state during the thermal draw. Suitable examples of such current collector materials include BiInSn, BiPbSn, InSn, and InCd, all of which are in a melted liquid state at the fiber draw temperature. In this embodiment, the current collector material is encapsulated, in the transverse cross section of the fiber, so that the melted current collector material is confined during the fiber draw. One example of this confinement configuration is shown in FIGS. 8A-8B, in which the current collectors 70 are disposed within the battery electrical contact regions; the electrical contact material encircles the current collector in the transverse cross section of the fiber so that the current collector is maintained in its intended location upon completion of the draw.

In an alternative embodiment, the current collector is provided as a material having a melting point temperature that is higher than the fiber draw temperature, whereby the current collector material cannot be melted during the fiber draw. In this embodiment, each current collector wire, filament, strand, or other current collector element to disposed within the fiber battery, e.g., within the region of the battery contact, is fed into a hole in the preform during the fiber battery draw. In this embodiment, wires including Cu, Al, Ti, Ni, stainless steel, or other suitable electrical conductor, here can be employed.

With these example fiber battery gel domain components, electrical contact materials, and electrical current collector materials, the fiber battery body material can be provided as, e.g., polyvinylidene fluoride (PVDF), polyethylene (PE), polypropylene (PP), polyvinylidene chloride (PVDC), polycarbonate (PC), liquid crystal polymer (LCP), polyvinyl chloride (PVC), cyclic olefin copolymer (COC), or other suitable materials.

In a preferred embodiment, the electrochemically active anode gel includes about 10.35 wt % PVDF, about 62 wt % EC/PC in a 1:1 volume ratio, about 1.9 wt % carbon black, about 14.1 wt % LiTFSI, and about 11.65 wt % LTO. The electrochemically active cathode gel in this preferred embodiment includes about 10.35 wt % PVDF, about 62 wt % EC/PC in a 1:1 volume ratio, about 1.9 wt % carbon black, about 14.1 wt % LiTFSI, and about 11.65 wt % LFP.

Turning to production of the fiber battery, in one fiber battery production embodiment, a preform is configured with the battery gels and other elements as-desired for thermal drawing into the fiber battery. In the manner described above with reference to FIGS. 6A-6D, an electrolyte gel element and electrochemically active anode and cathode gel elements for the battery preform are produced in one example by mixing the gel components at a temperature above the gelation temperature and then cooling the mixed gel components in a shape suitable for producing gel preform elements. The electrolyte gel components can be mixed in the viscous liquid state and the resulting liquid electrolyte gel poured onto a flat surface and cooled below the gelation temperature to form a solid electrolyte gel slab from which can be cut an electrolytic gel domain element for the preform. Similarly, the electrochemically active anode and cathode gel components can be mixed, separately, in the viscous liquid state and the resulting liquid electrode gels poured onto a flat surface and cooled below the gelation temperature to form a solid anode gel slab and solid cathode gel slab from which can be cut anode and cathode gel domain elements for the battery preform.

The battery preform can then be assembled, in the manner of FIGS. 6A-6D, with machining of pieces of fiber body material 12 and sheets of electrical contact material 68, channels 90 into which electrical current collectors can be disposed, either in the preform, or during the fiber draw. The fiber body material pieces can be further machined to include features 92 corresponding to the siting of gels within the preform. The pieces of fiber body material 12 and the sheets of electrode material 68 can then be arranged un a selected configuration, and thermally consolidated, under mechanical pressure, e.g., a clamp 94, to produce a preform having a slot 96 for battery gels. After consolidation, an electrolyte gel domain 62 and adjacent electrochemically active anode gel domains 110 and cathode gel domain 112 are inserted in the preform slot. It can be preferred to conduct the gel domain insertion in a glovebox, e.g., with Ar flowing. One end of the preform is closed off with fiber body material and then after gel domain insertion, the open end of the preform is sealed, e.g., with polyimide tape and chemically resistant epoxy. With this arrangement, the preform can be thermally drawn into a fiber battery.

Figure 9:
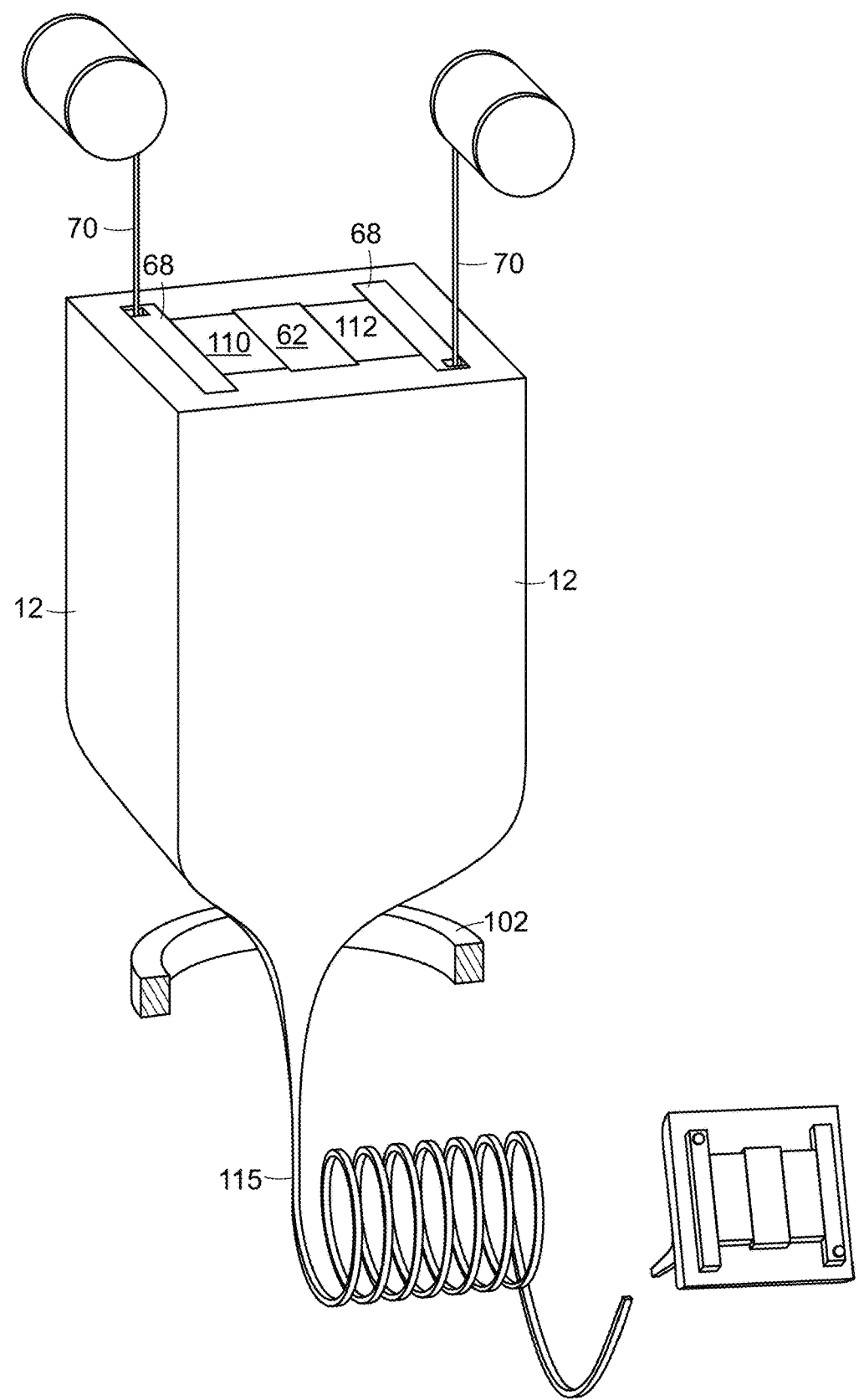
FIG. 9 is a schematic perspective view of a preform being thermally drawn into a fiber battery as provided herein.

As shown in FIG. 9, thermal drawing of the preform into a fiber battery is conducted in a draw tower, with a middle zone 102 that zone which sets the thermal draw temperature. The preform, including electrolyte gel 62, electrochemically active anode gel 110, electrochemically active cathode gel 112, electrical contacts 68, and fiber body material 12, is provided in the draw tower and in one embodiment, spools of electrical current collector wire 70 are configured for feeding electrical current collectors into the preform channels provided for the wire.

In one example drawing process, there is provided a three-zone fiber draw heating arrangement with atop-zone temperature of about 90° C., a middle-zone temperature of between about 170° C. and about 230° C., and a bottom-zone temperature of about 60° C., with a draw down ratio of about 30. A middle zone temperature of between about 170° C. and about 230° C. can be applicable for many material configurations, based on the selected fiber body material in which the gel domain battery components are disposed. The drawn fiber dimensions can be monitored during drawing, e.g., with laser-micrometers, and the atmosphere draw tower furnace can be maintained as-desired, e.g., under constant nitrogen gas purge. A particular advantage of this thermal drawing process is that the transverse cross sectional dimensions of the fiber, including the cross sectional dimensions of the gel domains, can be controlled by changing the capstan, or spool, speed, and without changing the preform.

As the preform is drawn under tension at the thermal draw temperature, the preform necks down and forms a fiber battery 115 that includes all of the battery gel domains of the preform, with the battery configuration of the preform preserved in the fiber battery 115 as-drawn. The drawn fiber battery exhibits mechanical flexibility as-drawn and can be drawn to arbitrarily long lengths, as kilometers of the fiber battery.

Figure 10A:
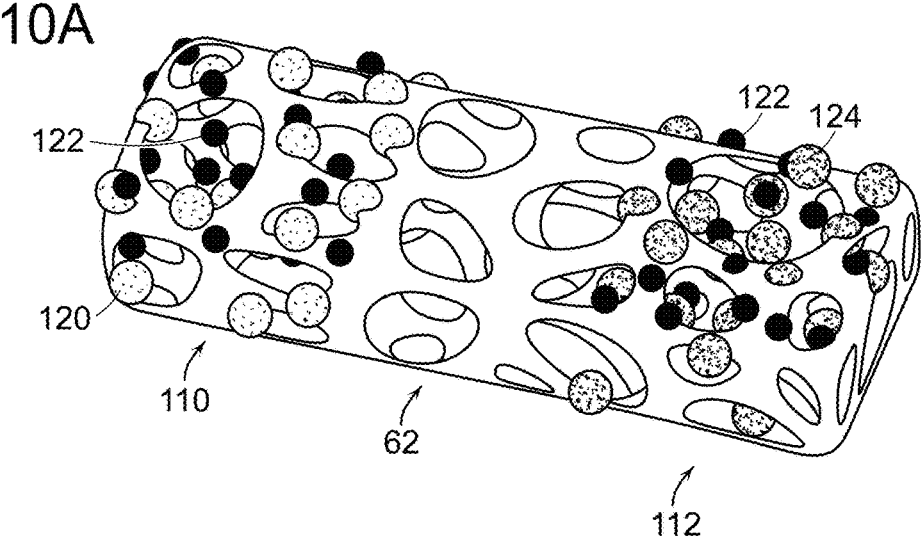
FIG. 10A-10C is a schematic perspective view of the composition of the three adjacent gel domains in the fiber body of FIGS. 8A-8B in a preform, at the thermal draw temperature, and in a thermally drawn fiber, respectively.
Figure 10B:
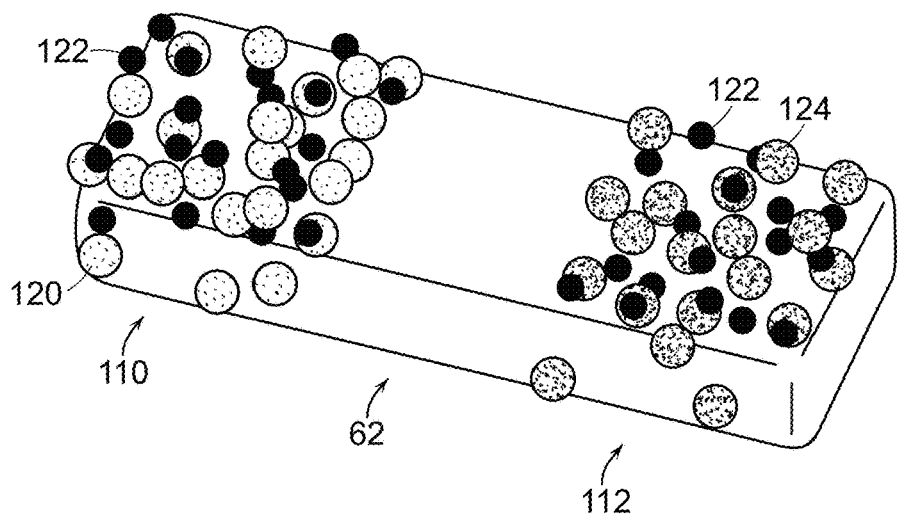
Figure 10C:
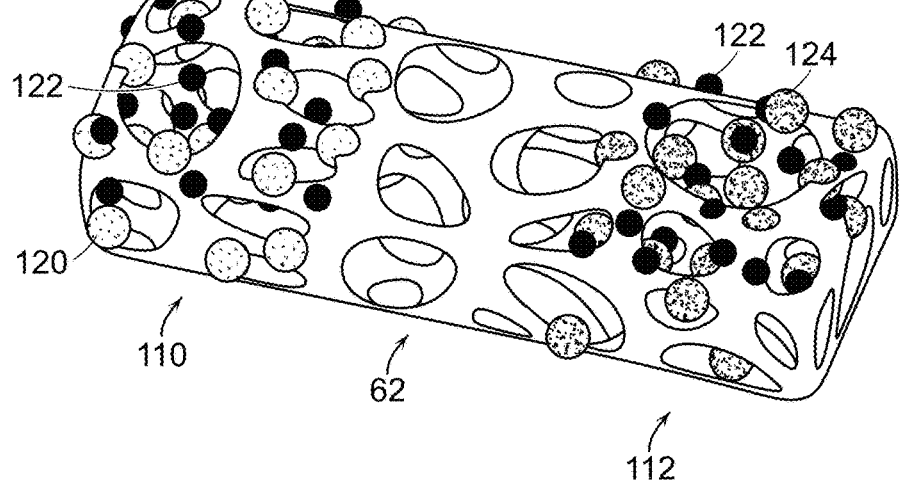

In both fiber supercapacitor and fiber battery examples described above, electrochemically active gel domains are arranged in a preform and thermally drawn into a fiber, with the gel domains maintained throughout the thermal draw process in their intended relative positions and with their intended compositions. As explained above, in embodiments provided herein, the compositions of the gel domains enable this condition by thermally induced phase separation. For example, considering fiber battery production by thermal drawing, and referring to FIGS. 10A, 10B, and 10C, the electrochemically active anode gel domain 110, cathode gel domain 112, and electrolyte domain 62 are provided in the battery preform as adjacent solid gel structures. The anode gel includes particles such as LTO 120 and carbon black 122, and the cathode gel includes particle such as LFP 124 and carbon black 122. In this example, the anode, cathode, and electrolyte gels all include the same host polymer-solvent pair, e.g., PVDF and PC/EC with LiTFSI, and therefore are shown in FIGS. 10A-10C with similar gel structure. It is to be recognized that for clarity, the interstices of the host polymer PVDF are shown clear, but it is to be recognized that they are filled with solvent fluid.

During thermal draw of the battery preform, at the draw temperature, referring to FIG. 10B, all of the anode gel domain 110, the cathode gel domain 112, and the electrolyte domain 62 are viscous liquids, with the PVDF mixed with LiTFSI and PC/EC. But the constituents of each gel domain remain in place in that domain by virtue of the viscosity of each domain. Therefore, the LTO 120 particles and carbon black particles 122 remain in the anode gel domain 110, and the LFP particles 124 and carbon black particles 122 remain the cathode gel domain 112. The gel domains do not intermix, even at the thermal draw temperature. Any particles and fluids specific to a given gel domain therefore are retained in that gel domain throughout the draw process. As the fiber battery cools during movement out of the draw tower, the structure of the gel domains returns to the non-liquid state, as shown in FIG. 10C, and the composition of each domain in the battery preform is preserved in the drawn fiber battery, while reduced from the macro-scale to the micro-scale.

The methods and fiber materials provided herein thereby enable the production of gel-based fiber devices having arrangements of material composition that are precisely controlled through preform production and thermal drawing processes. The preform-to-fiber thermal drawing process produces fibers that are themselves devices, and does so continuously and reproducibly over kilometer lengths. The entire device structure, from packaging to active materials and current collectors, is arranged at the macroscopic preform level and then effectively shrunk to the microscopic device level, with no additional assembly or packaging required.

Example I

Fiber Supercapacitor Production and Performance

The fiber supercapacitor design of FIGS. 4A-4B was produced by a thermal drawing process. An active material provided as activated carbon particles, (MTI Corporation), an electrical conductor provided as carbon black particles (VWR), a host polymer provided as PVDF (Arkema Inc.) and an ionic species provided as 1M LiTFSI in a solvent provided as PC, were mixed together at a temperature of about 200° C. in an argon-glovebox under the condition of less than about 1 ppm flow of $H_2O$ (Innovative Technologies) to form electrochemically active electrode gels. The electrochemically active electrode gels were prepared with 10.5 wt % PVDF, 63.0 wt % PC, 14.3 wt % LiTFSI, as the electrolyte salt, 10.5 wt % activated carbon, and 1.7 wt % carbon black. The electrolyte gel was prepared by mixing the host polymer PVDF and ionic species 1M LiTFSI in the solvent PC at 200° C., also in the argon-glovebox. The electrolyte gel was prepared as 17.0 wt % PVDF, 67.7 wt % PC, and 15.3 wt % LiTFSI as the electrolyte salt. The resulting viscous liquid gels were poured onto glass substrates, to form flat films of the gels in the glovebox.

Following the process flow of FIGS. 6A-6D, sheets of electrically conductive contacts provided as polyethylene (CPE) were machined to include void channels of about 1 mm×1 mm in dimensions for accepting a tungsten wires of about 50 μm-diameter during the draw. Slabs of cycloolefin copolymer (COC) (Topas) as fiber body material were cut to provide a preform thickness of about 13 mm, a preform width of about 24 mm, and a preform length of about 300 mm. The COC slabs were machined to include five void channels, two channels for the electrochemically active electrode gels, two channels for the CPE electrical contacts, and one channel for the electrolyte gel. The cross-sectional dimensions of the five void channels were 1.5 mm×9 mm for each of the CPE electrical contacts, 5 mm×5 mm for each of the two electrochemically active electrode gels, and 4 mm×6 mm for the electrolyte gel. The CPE contact sheets, cut to fit the fiber body dimensions, were arranged with the fiber body material and an end piece of fiber body material was fit on one end of the void channels. The arrangement was consolidated with a hot-press at 125° C. After consolidation, the preform was transferred to the Ar glovebox, and the two electrochemically active electrode gels and the electrolyte gel were inserted into the preform. The open end in the preform in which the gels were inserted was sealed by polyimide tape and chemically resistant epoxy.

The preform was drawn in a three-zone vertical tube furnace with a top-zone temperature of 90° C., a middle-zone set at a thermal draw temperature of 185° C., and a bottom-zone temperature of 60° C. During the fiber draw, two tungsten wires were fed into the channels of the preform that were machined for accepting the wires. The capstan speed was in the range of 0.5 m/min-2 m/min and the draw tension was in the range of 300 g/mm²-900 g/mm² The thermal fiber draw was conducted under constant nitrogen gas flow. The fiber dimensions were monitored with laser micrometers.

Figure 11A:
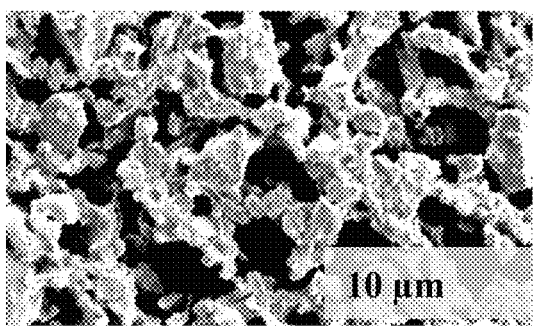
FIGS. 11A-11B is a scanning electron microscope image of a dried electrochemically active electrode gel and a dried electrolyte gel, respectively, of an experimental fiber supercapacitor like that of FIGS. 4A-4B.
Figure 11B:
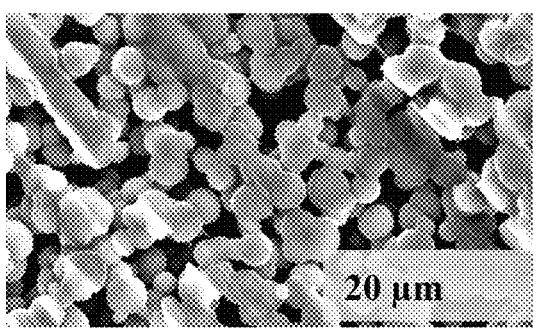

After thermal drawing, sections of the fiber were cut with lengths of 10 cm, 15 cm, 30 cm, 50 cm, 75 cm, 100 cm, 1.2 m, 5 m, 7.5 m, 20 m, 50 m, 75 m, 100 m, and 140 m to investigate the architecture of the thermally drawn gels of the supercapacitor architecture as a function of length. The gels were dried to remove the liquid present in the interstices of the gels, so that imaging of the gels could be conducted. First, the fiber body material was removed by dissolving in cyclohexane. Then the electrode and electrolyte gels were dried by heating at a temperature between about 60° C.-80° C. on a hotplate while exposed to the ambient to remove the liquid electrolyte from the gels. FIG. 11A is a scanning electron microscopy image of the dried electrode gel, and FIG. 11B is a scanning electron microscopy image of the dried electrolyte gel. The porous morphology of each of the gels is shown to have been successfully obtained through thermally induced phase separation during the thermal draw process. The cross-sectional area of each gel domain was measured. The cross-sectional area of each electrochemically active electrode gel was measured to be about 200×200 µm² and the area of the electrolyte gel was measured to be about 200×400 µm².

A length of the fiber supercapacitor was cut and the ends sealed with paraffin wax inside an Ar glovebox. A fiber supercapacitor cells was then connected with Cu wire. The cell was cycled between a voltage of 1.6 V and a voltage of 0.01 V at four different current rates, 10 µA/cm, 20 µA/cm, 40 µA/cm, and 80 µA/cm), in galvanostatic mode, using an Arbin battery test system (Arbin Instruments). Cyclovoltammetry was conducted across a voltage window between 0.01 V and 1.6 V at four different scan rates, 5 mV/s, 10 mV/s, 20 mV/s, and 50 mV/s.

The capacitance of the thermally drawn fiber supercapacitor was then calculated from both cyclovoltamogram and galvanostatic charge/discharge curves. With CV curve data, the capacitance was calculated by the equation:

$$C = \frac{1}{2 \times s \times \Delta V} \int I(V) dV, \quad (1)$$

where C is the capacitance, I is the current, s is the scan rate (Vt$^{-1}$), and V is potential. With galvanostatic charge-discharge curve date, the capacitance was derived from the equation of:

$$C = I/(\Delta V/\Delta t), \quad (2)$$

where I is the discharge current and the $\Delta V/\Delta t$ is the slope of the discharge curve. The energy, E, and power, P, of the fiber supercapacitor, given as $$E = \tfrac{1}{2} C \Delta V^2 \text{ and } P = E/\Delta t \quad (3)$$

were calculated from the galvanostatic discharge curves. The areal performance of fiber as well as coin cell was obtained by normalization of capacitance, energy, and power by the projected area of the electrochemically active electrode gels.

Figure 12A:
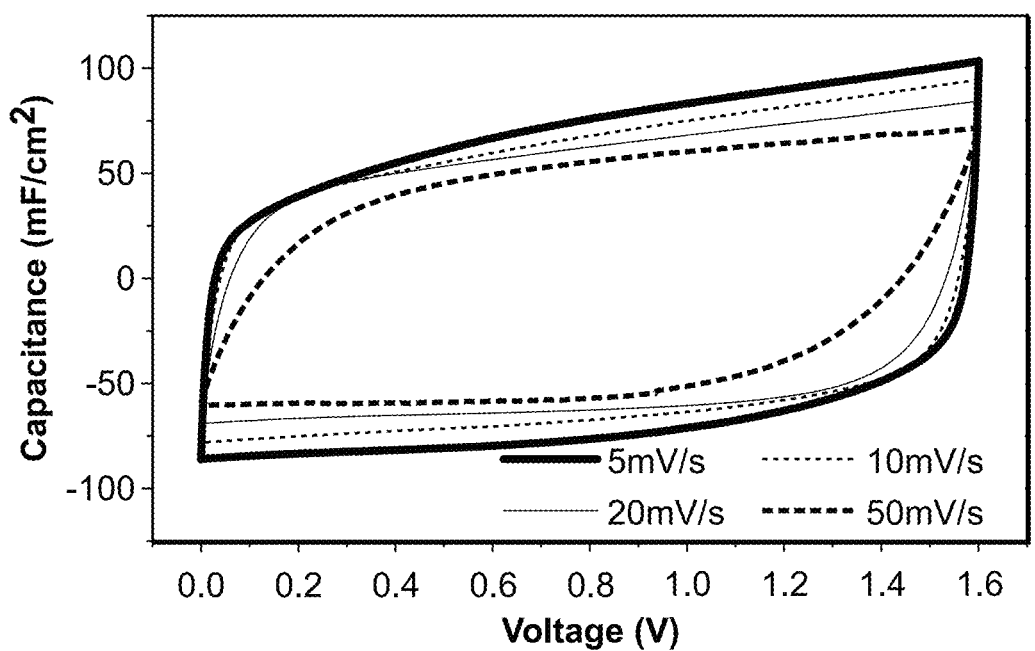
FIG. 12A is a plot of measured capacitance as a function of applied voltage, at four different applied voltage scan rates, for an experimental fiber supercapacitor like that of FIGS. 4A-4B.
Figure 12B:
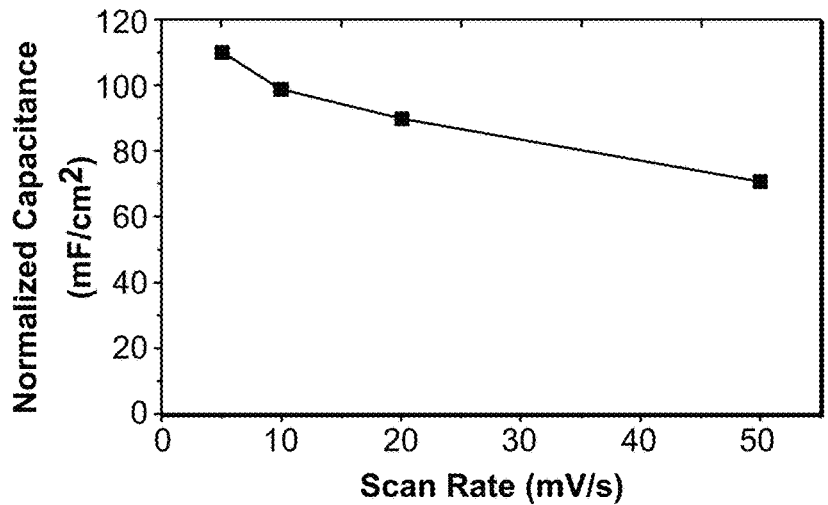
FIG. 12B is a plot of measured areal capacitance as a function of applied voltage scan rate for an experimental fiber supercapacitor like that of FIGS. 4A-4B.
Figure 12C:
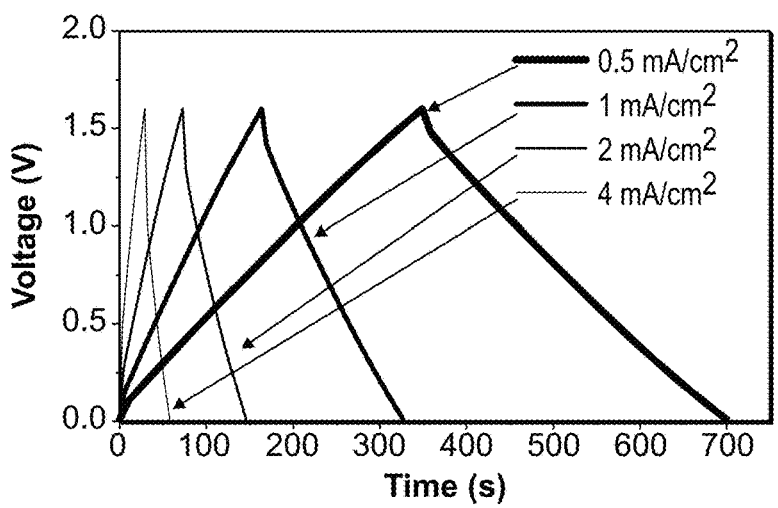
FIG. 12C is a plot of the galvanostatic charge-discharge curve for an experimental fiber supercapacitor like that of FIGS. 4A-4B for four different current densities.

FIG. 12A includes plots of the cyclic voltamogram (CV) curves at the scan rates of 5 mV/s, 10 mV/s, 20 mV/s, and 50 mV/s, across the voltage window of 0.01 V to 1.6 V. These plots show a nearly rectangular shape, indicating that the drawn fiber supercapacitor exhibits excellent EDLC behavior, without Faradaic redox reactions as have been reported for other carbon-based supercapacitors. FIG. 12B is a plot of the measured areal capacitance for different scan rates. This data demonstrates that capacitance retention ranged from 100% to ~64% across scan rates between 5 mV/s and 50 mV/s. FIG. 12C are plots of the galvanostatic charge-discharge (GCD) curves of the fiber supercapacitor for four different current densities.

The GCD curves exhibit the symmetrical triangular shape that is expected in the absence of secondary redox reactions or high internal resistance. It should be pointed out that the areal capacitance of nanomaterial-based electrodes are typically low due to their low material loading per unit area. The areal capacitance of the thermally drawn fiber supercapacitor is shown to be maintained from 100 mF cm$^{-2}$ to 90 mF cm$^{-2}$ as the current density is increased from 0.5 to 4 mA cm$^{-2}$. These values are outstanding in comparison to conventional, non-thermally drawn, fiber supercapacitors. Specifically, the thermally drawn fiber supercapacitor exhibits up to an order an of magnitude higher areal capacitance than conventional fiber supercapacitors based MWCNT (10 mF cm$^{-2}$), rGO/Ni (72 mF cm$^{-2}$), and pen ink (19 mF cm$^{-2}$), as well as non-carbon supercapacitors such as ZnO nanowires (2.3 mF cm$^{-2}$. One factor for this success is that in conventional supercapacitor designs, an increase in the areal loading of active material does not guarantee higher capacitance, because as the active electrode thickness is increased, ion access is delayed. In contrast, the thickness of the electrochemically active gel electrodes in the thermally drawn fiber supercapacitor can be relatively quite large, e.g., as great as 200 µm or more, which is 5-10 times thicker than conventional supercapacitor electrode widths, and even with this relatively greater width, access to active sites in the electrode is preserved by way of the interconnected pore structure of the electrode gel. Thus, the porosity of the electrodes enhances lithium ion access to the electrode active materials, and the porosity of the electrolyte enables high ionic conductivity.

Figure 12D:
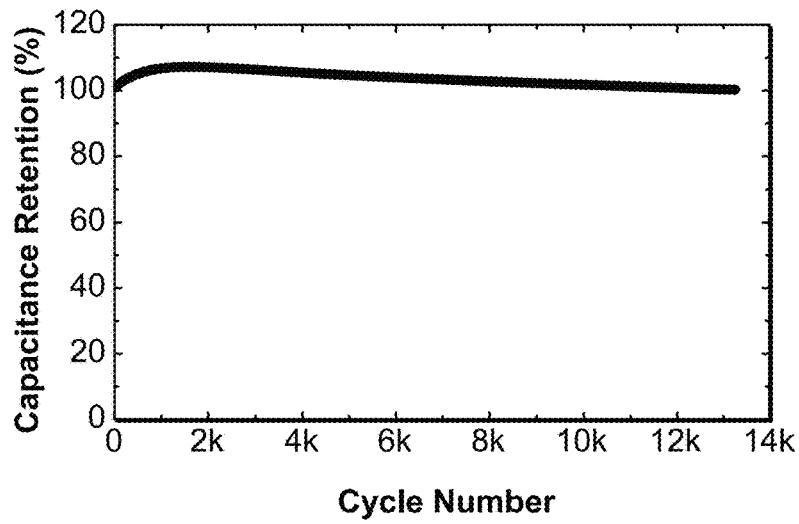
FIG. 12D is a plot of measured capacitance retention rate as a function of capacitor cycle number for a current density of 2 $mA/cm^2$ for an experimental fiber supercapacitor like that of FIGS. 4A-4B.
Figure 12E:
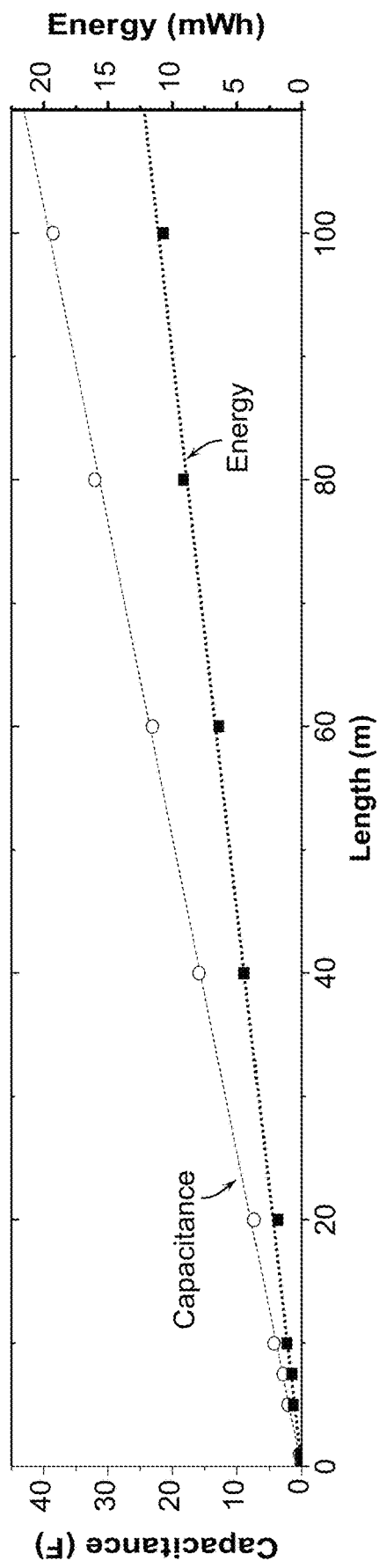
FIG. 12E is a plot of measured capacitance and a plot of measured energy as a function of fiber length of an experimental fiber supercapacitor like that of FIGS. 4A-4B.

FIG. 12D is a plot of long-term capacitance retention that was measured for the fiber supercapacitor. The capacitance is shown to be retained nearly 100% over 13000 cycles of charge-discharge cycling at a current density of 2 mA cm$^{-2}$. The capacitance of the fiber supercapacitor was measured for various fiber lengths. FIG. 12E is a plot of capacitance and energy as a function of fiber supercapacitor length. The fiber was characterized while spooled, demonstrating the device operability in any selected mechanical configuration. As shown in FIG. 12E, the capacitance energy is increased by about 100,000% by increasing the fiber supercapacitor length from 10 cm to 100 m. A working fiber supercapacitor of 100 m in length is heretofore been unachievable, but is shown to be provided directly herein. A length-normalized capacitance of 3.7 mF/cm (±0.3) and length-normalized energy density of 1.1 µWh/cm (±0.1) are successfully achieved herein.

Figure 12F:
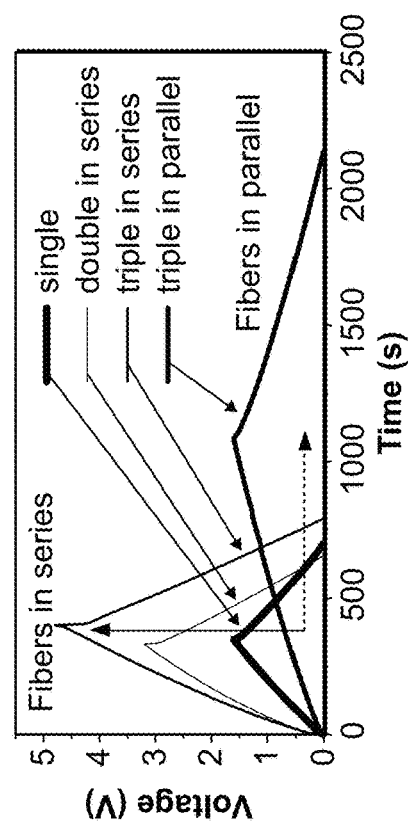
FIG. 12F is a plot of measured galvanostatic charge-discharge curves for experimental fiber supercapacitors like that of FIGS. 4A-4B arranged as a single fiber, double fibers in series, triple fibers in series, and triple fibers in parallel.

Several separate 10 cm-long fiber supercapacitors were connected in series and in parallel to measure the resulting capacitance. The current collectors in each of the fiber supercapacitors were exposed by razor blade and the sites of the current collectors connected between fiber supercapacitors by twisted Cu wires. FIG. 12F is a plot of the capacitance measured for a single fiber supercapacitor, and for two and three fiber supercapacitors connected in series, as well as for three fiber supercapacitors connected in parallel. This capacitance and voltage variation of multiple fiber supercapacitors connected in series or parallel demonstrates the ability to craft energy textiles with precisely controlled energy storage.

The experimental fiber supercapacitor is demonstrated, with the measurement data described above, to achieve a maximum areal energy density of 30 µWh/cm$^2$ and an areal power density of 5 mW/cm$^2$. The average specific capacitance normalized by the length is 3.7 mF/cm (±0.3), and length-normalized energy density is 1.1 µWh/cm (±0.1). Nearly 100% of the initial capacitance is retained after 13000 cycles. This fiber supercapacitor, produced in any selected length while exhibiting outstanding electrochemical performance, has groundbreaking implications in rechargeable fiber and textile device systems.

Example II

Fiber Battery Production and Performance

A fiber battery was thermally drawn by first mixing electrochemically active anode and cathode gels. For the anode gel, LTO particles (MTI Corporation), were mixed with carbon black particles (VWR), along with a host polymer of PVDF (Arkema Inc.) and an ionic species, 1M LiTFSI, in a solvent of PC:EC. The anode gel components were as follows: 8.1 wt % PVDF, 64.4 wt % PC/EC as the solvent, and 13.4 wt % LiTFSI as the electrolyte salt, with 12.1 wt % of LTO particles and 2 wt % carbon black particles. Similarly, for the cathode gel, LFP particles (MTI Corporation), were mixed with carbon black particles (VWR), along with a host polymer of PVDF (Arkema Inc.) and an ionic species, 1M LiTFSI, in a solvent of PC:EC; with the component fractions as follows: 8.1 wt % PVDF, 64.4 wt % PC/ED, 13.4 wt % LiTFSI, 12.1 wt % LFP particles, and 2 wt % carbon black particles. The battery electrolyte gel components included 17.1 wt % PFCF, 68.6 wt % PC/EC, and 14.3 wt % LiTFSI. Each of the gels was mixed at 200° C. in an argon-glovebox with <1 ppm of H$_2$O (Innovative Technologies), and each of the three gels as-mixed, in a viscous liquid state, was poured onto a glass substrate, with flat films being produced in the glovebox.

A fiber battery preform of about 3 cm in width and about 25 cm in length was produced in the manner described in Example I. Slabs of COC were machined as fiber body material, and arranged with cut sheets of CPE as battery contacts, and with BiIn wire (Indium corporation), as electrical current carriers. A cavity was formed by the assembled COC slabs to enable insertion of electrolyte, cathode, and anode gels within the preform. One end of the preform was closed with an additional piece of COC. The arrangement was then consolidated with a hot-press at 125° C. After consolidation, the preform was transferred to an Ar glovebox and cathode, anode, and electrolyte gels were inserted into the preform. The open end of the cavity in the preform was then sealed with polyimide tape and a chemically resistant epoxy.

The preform was drawn in a three-zone vertical tube furnace with a top-zone temperature of 90° C., a middle-zone, thermal draw temperature of 200° C., and a bottom-zone temperature of 60° C., under constant nitrogen flow. The draw down ratio was about 30, given a capstan speed of between about 1 m/min-2 m/min and the tension was in the range of 300 g/mm$^2$-800 g/mm$^2$. The fiber dimensions were monitored with laser-micrometers during the draw. After thermal drawing, the fiber battery was equilibrated for 24 hrs before operation. Fiber battery lengths were cut from between 10 cm and 140 m and sealed at the ends with paraffin wax inside an Ar glovebox. A fiber battery cell was configured with the length of cut fiber and with Cu wire.

Figure 13A:
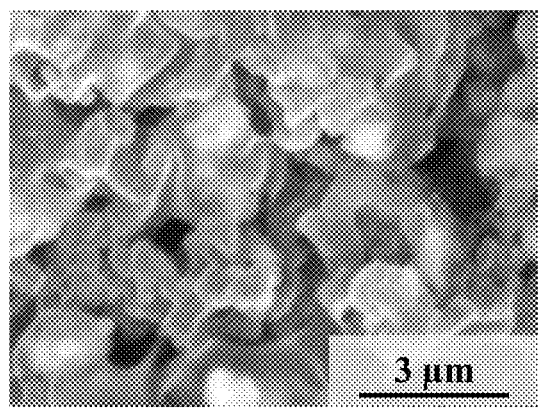
FIGS. 13A-13C is a scanning electron microscope image of a dried electrochemically active cathode gel, a dried electrochemically active anode gel, and a dried electrolyte gel, respectively, of an experimental fiber battery like that of FIGS. 8A-8B.
Figure 13B:
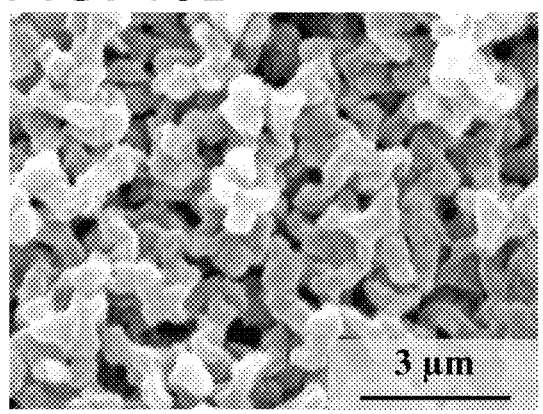
Figure 13C:
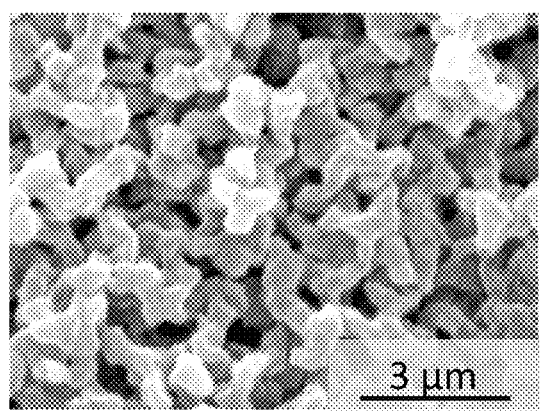

Before fiber battery operation, the composition of the fiber gel domains was investigated by energy dispersive spectroscopy (EDS) of a longitudinal cross section of the fiber battery. An EDS scan was conducted for titanium, a signature element of LTO, and an ES scan was conducted for iron, a signature element of LFP. The scans enabled mapping of titanium and iron across the fibber battery structure, and confirmed that the LTO particles were confined to the anode gel domain and that the LFP particles were confined to the cathode gel domain. Scanning electron microscopy (SEM) was then conducted to investigate the microstructure of the battery components. To produce SEM images, the fiber body material was removed by dissolving in cyclohexane. Then the anode, cathode, and electrolyte gels were dried by heating at a temperature between about 60° C.-80° C. on a hotplate while exposed to the ambient to remove the liquid electrolyte from the gels. FIG. 13A is a SEM of the dried fiber battery cathode gel, including LFP and carbon black particles with the polymer host-solvent. FIG. 13B is a SEM of the dried fiber battery anode gel, including LTO and carbon black particles with the polymer host-solvent. FIG. 13C is a SEM of the dried fiber battery electrolyte gel, including polymer host-solvent. All of the anode, cathode, and electrolyte gels exhibit a highly porous matrix, resulting from the phase separation of the host polymer PVDF and mixed solvents upon cooling from the thermal draw temperature. Minor microstructural differences between anode and cathode gel matrices are likely due to morphological differences in the original LTO and LFP particles.

Figure 14A:
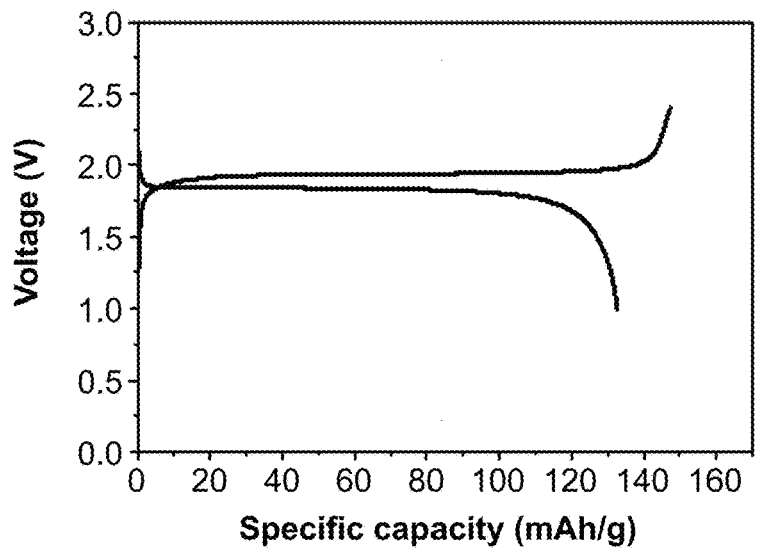
FIG. 14A is plot of measured galvanostatic charge-discharge curves for an experimental fiber battery like that of FIGS. 8A-8B.
Figure 14B:
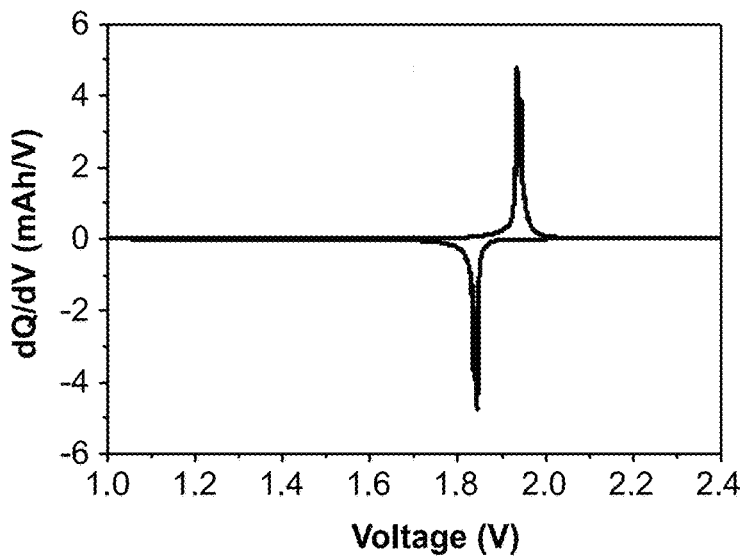
FIG. 14B is a plot of measured differential capacity as a function of applied voltage for an experimental fiber battery like that of FIGS. 8A-8B.
Figure 14C:
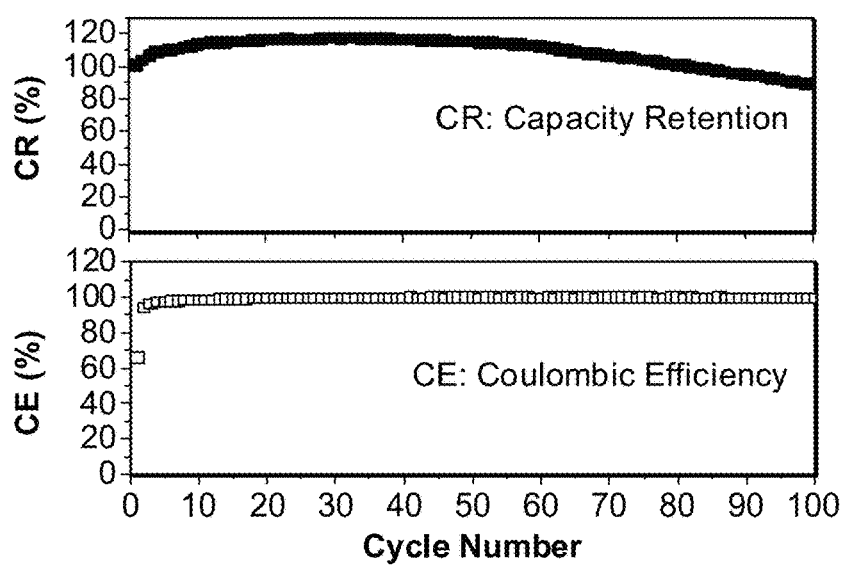
FIG. 14C is a plot of measured capacitor retention and a plot of measured coulombic efficiency as a function of battery cycle number for an experimental fiber battery like that of FIGS. 8A-8B.
Figure 14D:
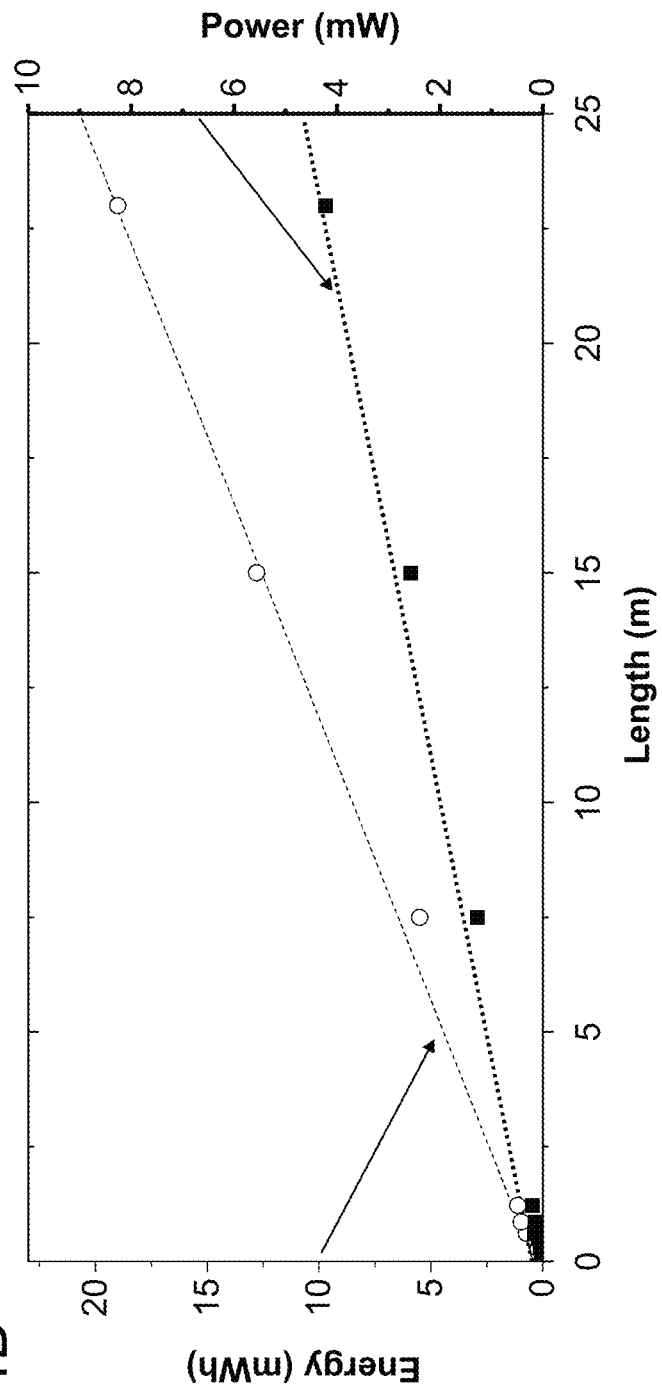
FIG. 14D is a first plot of measured energy and a second plot of measured power as a function of fiber length for an experimental fiber battery like that of FIGS. 8A-8B.

Electrochemical measurements were performed on the thermally drawn fiber battery by cycling the battery between the voltages of 2.4 V and 1.0 V at rate of 1 µA/cm in galvanostatic mode via an Arbin battery test system (Arbin Instruments). FIG. 14A is a plot of the charge-discharge profile of the fiber battery across the voltage range. FIG. 14B is a plot of the fiber battery differential capacity, dQ/dV, as a function of applied voltage. Sharp charge and discharge peaks are exhibited at 1.84 V and 1.94 V, as expected for the material system. FIG. 14C provides plots of capacity retention and coulombic efficiency as a function of cycle number at a cycle rate of 1 µA/cm. These demonstrate that over the course of 20 cycles, nearly 100% capacity retention is preserved. In addition, the fiber battery was connected for powering a 5 mm red LED, and was capable of doing so for over 5 hours of LED operation.

Figure 14E:
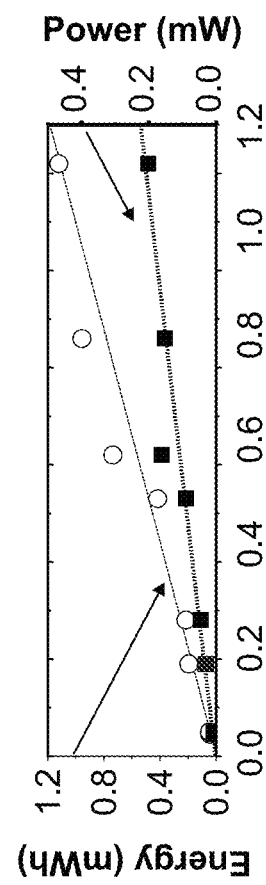
FIG. 14E is a second plot of measured energy and a second plot of measured power as a function of fiber length for an experimental fiber battery like that of FIGS. 8A-8B.
Figure 14F:
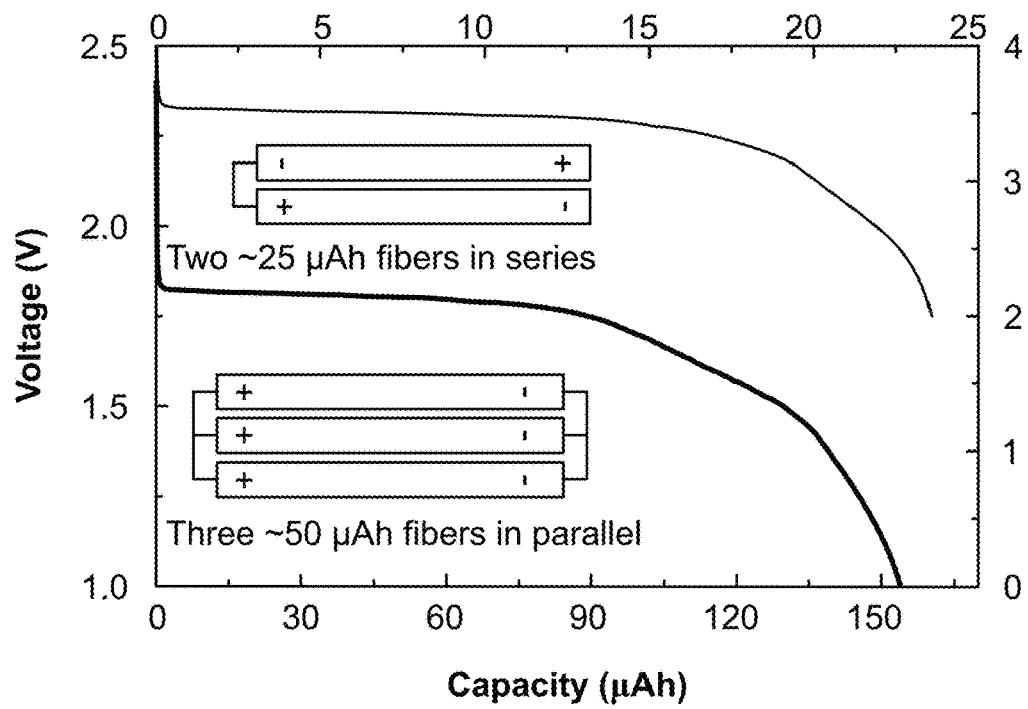
FIG. 14F is a plot of measured voltage as a function of discharge capacity of two 25 µAh fiber batteries in series and a plot of measured voltage as a function of discharge capacity of three 50 µAh fiber batteries in parallel for an experimental fiber battery like that of FIGS. 8A-8B.

The absolute capacity of the fiber battery was determined as a function of fiber battery length at 1 µA/cm. FIG. 14E is a plot of fiber battery energy and power as a function of length for up to 25 m. FIG. 14F is a plot of fiber battery energy and power as a function of length for up to 1.2 m. The absolute discharge capacity of the fiber battery is shown to linearly increase as the length of the fiber was increased, due to increase in active material as the anode and cathode lengths are correspondingly increased. An average length-normalized specific discharge capacity of 6 (±0.4) µAh/cm and length-normalized energy density of 10 (±0.8) µWh/cm was thereby demonstrated.

Figure 14G:
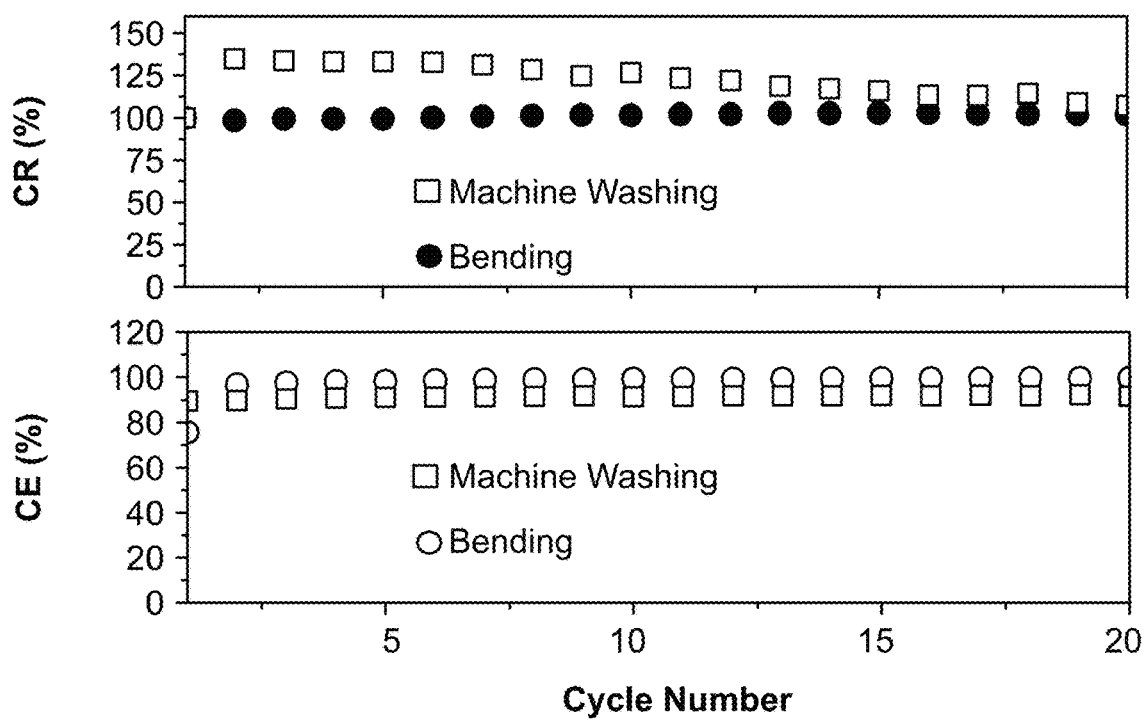
FIG. 14G is a plot of capacity retention and a plot of coulombic efficiency as a function of machine washing cycle number and bending cycle number for an experimental fiber battery like that of FIGS. 8A-8B.

Three 50 µAh fiber batteries were connected in parallel and two 25 µAh fiber batteries were connected in series and the resulting discharge profiles were measured. FIG. 14F is a plot of the measured discharge profiles. This demonstrates that capacity is successfully tripled when three fiber batteries are connected in parallel and that voltage is successfully doubled when two fiber batteries are connected in series. Fiber batteries thereby can be configured in any selected series/parallel array configuration to achieve selected capacity/voltage characteristics. The fiber battery was subjected to conventional liquid-based machine washing cycles and to bending cycles, to determine mechanical integrity. FIG. 14G provides plots of capacity retention and coulombic efficiency as a function of number of machine washing cycles and bending cycles. This demonstrates that there is substantially no loss in capacity retention or coulombic efficiency over the course of many washings and many bending cycles.

These examples demonstrate that fiber-based devices such as a fiber supercapacitor and a fiber battery can be produced with electrochemically active electrodes and electrolyte gels to capture heretofore unachievable energy and capacity capabilities in a fiber form. The fiber-based electrochemically active gels enable future generations of advanced textile and fabrics wherein sophisticated devices can be seamlessly integrated and powered by local, fiber-based, and rechargeable sources. Woven or knitted fabrics including fiber batteries and/or supercapacitors enable high capacity, mechanically flexible, energy systems that can be integrated into garments, home furnishings, vehicle and home interiors, sensors and actuators, drug delivery systems, and a wide range of other applications.

The gels provided herein for incorporation into a thermally drawn fiber enable in situ production of fiber domains including both liquid and solid phases, and enable a host matrix configuration that is particularly well-suited for providing interstitial sites at which a selected liquid is disposed when the gel is in the rubbery condition including a solid host matrix. This configuration enables enhanced device operation, such as enhanced ion transport in a supercapacitor or battery arrangement, by accommodating relatively thick electrodes without sacrificing electrochemical performance.

Further, the fiber-based energy devices provided herein provide textile-compatible energy solutions with machine weavability, mechanical flexibility, water resistance, durability, high power, and high areal energy density. The fiber-based energy devices can be scaled to arbitrarily long lengths and used as building blocks for modular power solutions using parallel and series fiber connections that are arranged, for example, within a fabric. Integrated large-area textiles with fiber-based energy devices included therein therefore enable rechargeable all-fiber electronic fabrics. It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A fiber comprising:
   a fiber body including a fiber body material and having a longitudinal-axis fiber body length;
   a plurality of gel domains disposed within the fiber body along at least a portion of the longitudinal-axis fiber body length, each gel domain in the plurality of gel domains including a porous host matrix material and including a liquid gel component that is entrapped in molecular structure of the porous host matrix material and that is disposed in interstices of the porous host matrix material; and
   at least two of the gel domains within the fiber body being disposed directly adjacent to each other in direct physical contact with each other.

2. The fiber of claim 1 wherein the fiber body material comprises a polymeric, electrically insulating material.

3. The fiber of claim 1 wherein the fiber body material includes at least one polymer selected from polyethylene (PE), polypropylene (PP), polyvinylidene chloride (PVDC), polycarbonate (PC), liquid crystal polymer (LCP), polyvinyl chloride (PVC), cyclic olefin copolymer (COC), and polychlorotrifluoroethylene (PCTFE).

4. The fiber of claim 1 wherein at least one gel domain in the plurality of gel domains includes a host matrix material comprising a polymer.

5. The fiber of claim 4 wherein said porous host matrix material comprises a polymer selected from polyethylene glycol (PEG), polyethylene oxide (PEO), polyvinylidene fluoride (PVDF), polyacrylonitrile (PAN), polymethyl methacrylate (PMMA), and polyvinyl alcohol (PVA).

6. The fiber of claim 4 wherein the at least one gel domain including a polymer host matrix material includes a liquid gel component that is entrapped in polymeric chains of the polymer host matrix material molecular structure.

7. The fiber of claim 1 wherein at least one gel domain in the plurality of gel domains comprises a liquid gel component including a solvent that homogeneously mixes with the porous host matrix material as a viscous liquid at temperatures above a gelation temperature characteristic for the solvent and porous host material matrix.

8. The fiber of claim 7 wherein at least one gel domain in the plurality of gel domains includes a polymer host matrix material and includes an ionic liquid selected from 1-ethyl-3-methylimidazolium (EMI), 1-butyl-3-methylimidazolium (BMI), N-Propyl-N-methylpyrrolidinium (PYR13), 1-Butyl-1-methylpyrrolidinium (PYR14), Tetraethylammonium (Et4N), chloride (Cl), bromide (Br), tetrafluoroborate (BF4), hexafluorophosphate (PF6), bis(fluorosulfonyl)imide (FSI), and bis(trifluoromethylsulfonyl)imide (TFSI).

9. The fiber of claim 1 wherein at least one gel domain in the plurality of gel domains includes a polymer host matrix material and includes a liquid gel component selected from ethylene carbonate/propylene carbonate (EC/PC), dimethyl carbonate (DMC), diethyl carbonate (DEC), fluoroethylene carbonate (FEC), ethyl methyl carbonate (EMC), butyrolactone (BL), and vinylene carbonate (VC).

10. The fiber of claim 1 wherein at least one gel domain in the plurality of gel domains includes solid particles dispersed in the porous host matrix material.

11. The fiber of claim 10 wherein at least one gel domain in the plurality of gel domains includes electrically conducting solid particles dispersed in the porous host matrix material.

12. The fiber of claim 11 wherein the electrically conducting solid particles comprise carbon black particles.

13. The fiber of claim 10 wherein at least one gel domain in the plurality of gel domains includes activated carbon particles dispersed in the porous host matrix material.

14. The fiber of claim 1 wherein at least one gel domain in the plurality of gel domains includes solid particles selected from activated carbon particles, carbon black particles, carbon nanotubes, graphene particles, silicon carbide particles, titanium carbide particles, tungsten carbide particles, manganese oxide ($MnO_2$) particles, titanium oxide particles, and silicon oxide particles.

15. The fiber of claim 1 wherein at least one gel domain in the plurality of gel domains includes a salt.

16. The fiber of claim 15 wherein the salt includes at least one of LiX, where X=I, Cl, Br, $ClO_4$, $CF_3SO_3$, $PF_6$, $BF_4$, or $AsF_6$; NaX, where X=I, Cl, Br, $ClO_4$, $CF_3SO_3$, $PF_6$, $BF_4$, or $AsF_6$; MgX where X=$(CF_3SO_3)_2$ or $(AlCl_3\text{-}xRxR')_2$ wherein R, R'=an akyl group; and AlX, where X=$(CF_3SO_3)_3$ or $Cl_3$/[EMIm]Cl.

17. The fiber of claim 1 wherein at least one gel domain in the plurality of gel domains includes an electrolytic fluid.

18. The fiber of claim 1 wherein at least one gel domain in the plurality of gel domains includes an ionic species selected from lithium-nickel cobalt manganese oxide (NMC), lithium cobalt oxide (LCO), lithium manganese oxide (LMO), lithium nickel cobalt aluminum oxide (NCA), lithium iron phosphate (LFP), lithium iron sulphate fluoride (LFSF), lithium titanium sulfide (LTS), sodium vanadium phosphate fluoride (NVSF), sodium iron phosphate (NFP), magnesium cobalt oxide (MCO), magnesium scandium selenide (MSS), magnesium indium sulfide (MIS), aluminum vanadium oxide (AVO), iron fluoride (FeFx), cobalt fluoride (CoFx), iron chloride (FeClx), sulfur (S), lithium sulfide (Li2Sx), selenium (Se), Te (tellurium), iodine (I), lithium iodide (LiI), and carbon.

19. The fiber of claim 1 wherein at least one gel domain in the plurality of gel domains comprises an ionic species selected from lithium, lithium titanate (LTO), sodium, magnesium, aluminum, graphite, CNT, graphene, silicon, germanium, tin, and lithium oxide.

20. The fiber of claim 1 wherein at least one gel domain in the plurality of gel domains includes solid electrically conducting particles dispersed in the porous host matrix material, and includes ionically conducting fluid disposed in interstices of the porous host matrix material.

21. The fiber of claim 1 wherein at a common temperature, the fiber body material has a viscosity between about $10^4$ Poise and about $10^7$ Poise and each gel domain in the plurality of gel domains has a viscosity between about $10^3$ Poise and about $10^5$ Poise.

22. The fiber of claim 1 further comprising at least one polymeric electrical contact, each polymeric electrical contact disposed in contact with a gel domain and extending the fiber body length.

23. The fiber of claim 22 further comprising at least one electrical current conductor, each electrical current conductor disposed in electrical contact with a polymeric electrical contact and extending the fiber body length.

24. The fiber of claim 23 wherein each electrical current conductor comprises a wire selected from tungsten wire, Cu wire, Al wire, Ti wire, Ni wire, and stainless steel wire.

25. The fiber of claim 1 wherein the plurality of gel domains includes an electrolytic gel domain comprising an ionically conducting gel component, the electrolytic gel domain being disposed within the fiber body in direct contact with each of two electrochemically active electrode gel domains, each electrochemically active electrode gel domain comprising an electrically conducting gel component and an ionically conducting gel component.

26. The fiber of claim 1 wherein the plurality of gel domains includes an electrolytic gel domain comprising an ionically conducting gel component, the electrolytic gel domain being disposed within the fiber body in direct contact with an electrochemically active anode gel domain and an electrochemically active cathode gel domain, each of the anode and cathode gel domains comprising an electrically conducting gel component and an electrochemically active gel component.

27. A fiber comprising:
a fiber body including a polymeric fiber body material and having a longitudinal-axis fiber body length;
a plurality of gel domains disposed within the fiber body along at least a portion of the longitudinal-axis fiber body length, each gel domain in the plurality of gel domains including a porous polymer host matrix material and including an ionically conducting liquid solvent component that is entrapped in molecular structure of the polymer host matrix material and that is disposed in interstices of the polymer host material matrix; at least one of the gel domains being disposed within the fiber body between and in direct contact with two electrochemically active electrode gel domains, each electrochemically active electrode gel domain including electrically conducting particles dispersed in the polymer host material matrix;
a separate polymeric electrical contact disposed in direct contact with each one of the two electrochemically active electrode gel domains and extending the fiber body length; and
a separate current collector disposed in direct contact with each polymeric electrical contact and extending the fiber body length.

28. A fiber comprising:
a fiber body including a polymeric fiber body material and having a longitudinal-axis fiber body length;
a plurality of gel domains disposed within the fiber body along at least a portion of the longitudinal-axis fiber body length, each gel domain in the plurality of gel domains including a porous polymer host matrix material and including an ionically conducting liquid solvent component that is entrapped in molecular structure of the polymer host matrix material and that is disposed in interstices of the polymer host material matrix; at least one of the gel domains being disposed within the fiber body between and in direct contact with an electrochemically active anode gel domain and an electrochemically active cathode gel domain, the electrochemically active anode gel domain and the electrochemically active cathode domain each including electrically conducting particles dispersed in the polymer host material matrix, the electrochemically active anode gel domain further including lithium titanate and the electrochemically active cathode gel domain further including lithium iron phosphate;

a separate polymeric electrical contact disposed in direct contact with each one of the electrochemically active electrode gel domains and extending the fiber body length; and a separate current collector disposed in direct contact with each polymeric electrical contact and extending the fiber body length.

29. A method for forming a fiber comprising:

assembling a preform comprising fiber body material and a plurality of gel domains that are disposed at central preform sites within the fiber body material in a transverse cross section of the preform, each gel domain in the plurality of gel domains including a porous polymer host matrix material and including an ionically conducting liquid gel component that is entrapped in molecular structure of the host matrix material and that is disposed in interstices of the host material matrix, at least one of the gel domains being disposed between and in direct contact with two electrochemically active electrode gel domains, each electrochemically active electrode gel domain including electrically conducting particles dispersed in the polymer host material matrix, and with a separate polymeric electrical contact disposed in direct contact with each one of the two electrochemically active electrode gel domains;

feeding at least one electrically conducting wire into the preform, in direct contact with a polymeric electrical contact in the preform; and thermally drawing the assembled preform into a fiber at a thermal draw temperature at which the fiber body material has a viscosity that is greater than a viscosity of each gel domain in the plurality of gel domains and at which each gel domain in the plurality of gel domains is a viscous liquid.

30. A method for forming a fiber comprising:

assembling a preform comprising fiber body material and a plurality of gel domains that are disposed at central preform sites within the fiber body material in a transverse cross section of the preform, each gel domain in the plurality of gel domains including a porous polymer host matrix material and including an ionically conducting liquid gel component that is entrapped in molecular structure of the host matrix material and that is disposed in interstices of the host material matrix, at least one of the gel domains being disposed between and in direct contact with an electrochemically active anode gel domain and an electrochemically active cathode gel domain, each of the electrochemically active anode and cathode gel domains including electrically conducting particles dispersed in the polymer host material matrix and including active particles, and with a separate polymeric electrical contact disposed in direct contact with each of the electrochemically active anode and cathode gel domains;

feeding at least one electrically conducting wire into the preform, in direct contact with a polymeric electrical contact in the preform; and thermally drawing the assembled preform into a fiber at a thermal draw temperature at which the fiber body material has a viscosity that is greater than a viscosity of each gel domain in the plurality of gel domains and at which each gel domain in the plurality of gel domains is a viscous liquid.

* * * * *